United States Patent
Wilson et al.

(10) Patent No.: US 11,340,795 B2
(45) Date of Patent: *May 24, 2022

(54) SNAPSHOT METADATA MANAGEMENT

(71) Applicant: EMC IP Holding Company LLC, Hopkinton, MA (US)

(72) Inventors: Jeffrey Wilson, Franklin, MA (US); Michael Ferrari, Douglas, MA (US); Mark J. Halstead, Holliston, MA (US); Sandeep Chandrashekara, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/885,662

(22) Filed: May 28, 2020

(65) Prior Publication Data

US 2021/0373781 A1   Dec. 2, 2021

(51) Int. Cl.
*G06F 3/06* (2006.01)
*G06F 11/14* (2006.01)

(52) U.S. Cl.
CPC ............ *G06F 3/0619* (2013.01); *G06F 3/065* (2013.01); *G06F 3/0689* (2013.01); *G06F 11/1448* (2013.01)

(58) Field of Classification Search
None
See application file for complete search history.

(56) References Cited

U.S. PATENT DOCUMENTS

| | | | |
|---|---|---|---|
| 7,340,489 B2 | 3/2008 | Vishlitzky et al. | |
| 9,569,122 B2 | 2/2017 | Frankel et al. | |
| 9,965,216 B1 | 5/2018 | Jaganathan et al. | |
| 2012/0042286 A1 | 2/2012 | Sullivan et al. | |
| 2014/0244935 A1* | 8/2014 | Ezra | G06F 3/065 |
| | | | 711/133 |
| 2018/0011893 A1 | 1/2018 | Kimura | |

OTHER PUBLICATIONS

U.S. Appl. No. 16/885,702, filed May 28, 2020, Tobin, et al.

* cited by examiner

*Primary Examiner* — Kaushikkumar M Patel
(74) *Attorney, Agent, or Firm* — Muirhead and Saturnelli, LLC

(57) ABSTRACT

A snapshot lookup table (SLT) and snapshot pointer structure(s) (SPSs) may be provided for a logical data unit (LSU), each SPS entry corresponding to an LSU data portion and a physical storage location at which data is stored for the data portion for a particular snapshot. A current lookup table (CLT) for a current time may be provided for an LSU, including an entry for each LSU data that points to a respective entry of an SPS. Each time a first write following the creation of a snapshot is made to an LSU data portion, the corresponding CLT entry may be updated to point to the SPS entry that was updated to point to an LSU track table entry. To create a snapshot, a snapshot lookup table (SLT) is created for each snapshot, and the contents of the CLT are copied to the newly created SLT.

17 Claims, 24 Drawing Sheets

| LSU | LSU Track | Cache Pointer |
|---|---|---|
| 1 | 0 | 77 |
| 1 | 1 | 14 |
| 1 | 2 | 227 |
| 1 | 3 | 922 |
| 1 | 4 | 3 |
| 1 | 5 | 432 |
| 1 | 6 | 45 |
| 1 | 7 | 577 |
| 1 | 8 | 61 |
| 2 | 9 | 199 |
| 2 | 0 | 65 |
| 2 | 1 | 35 |
| 2 | 2 | 1 |

```
┌────┬────┬─────┬────┐
│ DP │ DP │ ••• │ DP │
├────┼────┤     ├────┤
│ SN │ SN │     │ SN │
└────┴────┴─────┴────┘
     130

┌────┬────┬─────┬────┐
│ ID │ ID │ ••• │ ID │
├────┼────┤     ├────┤
│ SN │ SN │     │ SN │
└────┴────┴─────┴────┘
     120

```

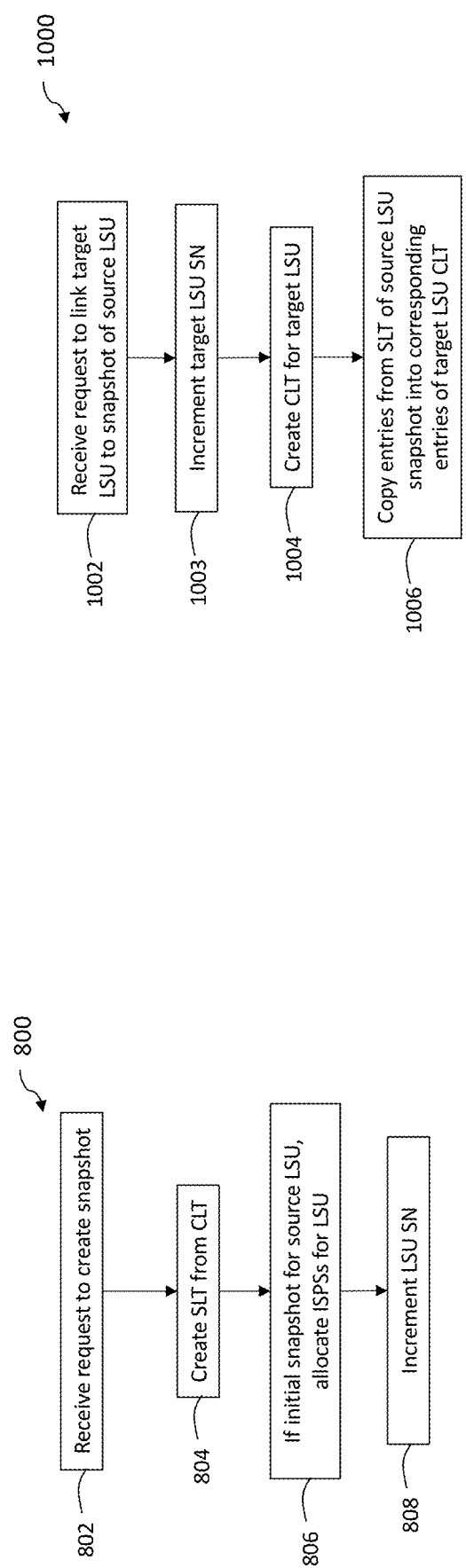

SNAPSHOT METADATA MANAGEMENT

BACKGROUND

Technical Field

This application generally relates to data storage systems, and more particularly to managing snapshot metadata on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (TO) operations utilizing a physical storage device of the storage system, one or more components of the host system, storage system and network components therebetween may be used.

Host systems may not address the physical storage devices of a storage systems directly, but rather access to data may be provided to one or more host systems from what the host systems view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

As used herein, a "snapshot" is a point-in-time image of an LSU. It may be desirable to be able to quickly generate and access snapshots. There are many known ways to manage snapshots in a storage system. For example, snapshot functionality may be provided on a storage system using protection bits to indicate when a track needs to be copied to a target logical device for the snapshot. Such snapshot functionality is described, for example, in U.S. Pat. No. 7,340,489 to Vishlitzky, et al. titled "Virtual Storage Devices", which is incorporated by reference herein. A session corresponding to the protection bit may be established so that when a protection bit is set, a write operation to a track of the storage device is intercepted before the write operation modifies the track. However, each snapshot uses at least one of the session bits (which are provided separately for each data portion, e.g., track) and uses a snapshot target LSU, both of which require a significant amount of overhead. Such snapshot functionality may be considered a target-based snapshot mechanism that uses target-based snapshots. In instances where it is desirable to have a large number of snapshots, the above-described overhead associated with target-based snapshots may be unacceptable.

Accordingly, it may be desirable to provide a system where it is possible to maintain a relatively large number of snapshots for a logical device without incurring the significant amount of overhead that would be associated with the above-described target-based snapshots and other conventional snapshot mechanisms.

Targetless snapshots, which don't require a target LSU, may reduce an amount of overhead incurred in maintaining a relatively large number of snapshots, compared to the above-described target-based snapshots and other conventional snapshot mechanisms. Targetless snapshots are described in U.S. Pat. No. 9,965,216, titled "Targetless Snapshots," issued May 8, 2018, to Jaganathan et al. ("the Jaganathan patent").

SUMMARY OF THE INVENTION

In embodiment, a method of managing snapshots on a data storage system including one or more physical storage devices on which data for a plurality of logical storage units is stored, each logical storage unit including a plurality of data portions, is performed. The method includes, for a first of the plurality of logical storage units, providing a first snapshot pointer structure including a plurality of entries, each entry corresponding to a physical storage location at which data is stored for a data portion of the first logical storage unit at a particular point in time, and providing a first snapshot lookup table for the first logical storage unit, the first snapshot lookup table corresponding to a first point in time and including a plurality of entries, each entry of the snapshot lookup table corresponding to a respective one of the plurality of data portions of the first logical storage unit and including a reference to a respective entry of the first snapshot pointer structure. The method may further include providing a current lookup table for the first logical storage unit, the current lookup table corresponding to a current time and including a plurality of entries, each entry of the current lookup table corresponding to a respective one of the plurality of data portions of the first logical storage unit and including a reference to a respective entry of the first snapshot pointer structure. A first entry of the first snapshot pointer structure may correspond to a first data portion of the first logical storage unit at the first point in time, and the first entry of the first snapshot pointer structure is referenced by a first entry of the first lookup table corresponding to the first data portion and a first entry of the current lookup table corresponding to the first data portion. The method further may include, receiving a write request for the first data portion, and in response to receiving the write request, determining if the write request is a first write request to the first data portion since the first snapshot table was created, and, if the write request is the first write request for the data portion since the snapshot table was created, designating a second entry of the first snapshot pointer structure to the first data portion, and updating the first entry of the current lookup table to reference the second entry of the first snapshot pointer structure, wherein the first entry of the first snapshot lookup table is not updated. In response to a request to create another snapshot of the first logical storage unit, creating a second snapshot lookup table for the first logical storage unit by copying contents of the current lookup table. The method may further include, in response to a request to link a target logical storage unit to the first logical storage unit for the first point in time, creating a target current lookup table, including copying contents of the first snapshot lookup table into the target current lookup table. A logical storage unit may include a plurality of zones, each zone representing a subset of the logical storage unit. The method may further include, in response to a first write request to a first zone of the target logical storage unit since the target snapshot was created, creating a target snapshot pointer structure for the target logical storage unit. The method may further include receiving a read request for a first data portion of the target logical storage unit, and, in response to the read request, determining a physical storage location of the first data portion of the target data structure by accessing a first entry of the target current lookup table corresponding to the first data portion.

In another embodiment of the invention, a system for managing snapshots on the data storage system including one or more physical storage devices on which data for a plurality of logical storage units is stored, each logical storage unit including a plurality of data portions, may be provided. The system includes a first snapshot pointer structure for a first of the plurality of logical storage units, the first snapshot pointer structure including a plurality of entries, each entry corresponding to a physical storage location at which data is stored for a data portion of the first logical storage unit at a particular point in time, and a first snapshot lookup table for the first logical storage unit, the first snapshot lookup table corresponding to a first point in time and including a plurality of entries, each entry of the snapshot lookup table corresponding to a respective one of the plurality of data portions of the first logical storage unit and including a reference to a respective entry of the first snapshot pointer structure. The system may further include a current lookup table for the first logical storage unit, the current lookup table corresponding to a current time and including a plurality of entries, each entry of the current lookup table corresponding to a respective one of the plurality of data portions of the first logical storage unit and including a reference to a respective entry of the first snapshot pointer structure. A first entry of the first snapshot pointer structure corresponds to a first data portion of the first logical storage unit at the first point in time, and the first entry of the first snapshot pointer structure is referenced by a first entry of the first lookup table corresponding to the first data portion and a first entry of the current lookup table corresponding to the first data portion. The system further may include memory having code stored thereon that, when executed, performs a method including receiving a write request for the first data portion, and, in response to receiving the write request, determining if the write request is a first write request to the first data portion since the first snapshot table was created, and, if the write request is the first write request for the data portion since the snapshot table was created, designating a second entry of the first snapshot pointer structure to the first data portion, and updating the first entry of the current lookup table to reference the second entry of the first snapshot pointer structure, wherein the first entry of the first snapshot lookup table is not updated. The system further may include memory having code stored thereon that, when executed, performs a method including, in response to a request to create another snapshot of the first logical storage unit, creating a second snapshot lookup table for the first logical storage unit by copying contents of the current lookup table. The system further may include memory having code stored thereon that, when executed, performs a method including, in response to a request to link a target logical storage unit to the first logical storage unit for the first point in time, creating a target current lookup table, including copying contents of the first snapshot lookup table into the target current lookup table. A logical storage unit may include a plurality of zones, each zone representing a subset of the logical storage unit, and the method further may include, in response to a first write request to a first zone of the target logical storage unit since the target snapshot was created, creating a target snapshot pointer structure for the target logical storage unit. A logical storage unit may include a plurality of zones, each zone representing a subset of the logical storage unit, and the method further may include receiving a read request for a first data portion of the target logical storage unit, and, in response to the read request, determining a physical storage location of the first data portion of the target data structure by accessing a first entry of the target current lookup table corresponding to the first data portion.

In another embodiment of the invention, computer-readable media having software stored thereon is provided for managing snapshots on a data storage system including one or more physical storage devices on which data for plurality of logical storage units is stored, wherein each logical storage unit may include a plurality of data portions. The software includes executable code that provides a first snapshot pointer structure for a first of the plurality of logical storage units, the first snapshot pointer structure including a plurality of entries, each entry corresponding to a physical storage location at which data is stored for a data portion of the first logical storage unit at a particular point in time, and executable code that provides a first snapshot lookup table for the first logical storage unit, the first snapshot lookup table corresponding to a first point in time and including a plurality of entries, each entry of the snapshot lookup table corresponding to a respective one of the plurality of data portions of the first logical storage unit and including a reference to a respective entry of the first snapshot pointer structure. The software may further include executable code that provides a current lookup table for the first logical storage unit, the current lookup table corresponding to a current time and including a plurality of entries, each entry of the current lookup table corresponding to a respective one of the plurality of data portions of the first logical storage unit and including a reference to a respective entry of the first snapshot pointer structure. A first entry of the first snapshot pointer structure corresponds to a first data portion of the first logical storage unit at the first point in time, and the first entry of the first snapshot pointer structure is referenced by a first entry of the first lookup table corresponding to the first data portion and a first entry of the current lookup table corresponding to the first data portion. The software further may include executable code that receives a write request for the first data portion, and executable code that, in response to receiving the write request, determines if the write request is a first write request to the first data portion since the first snapshot table was created, and, if the write request is the first write request for the data portion since the snapshot table was created, designates a second entry of the first snapshot pointer structure to the first data portion, and updates the first entry of the current lookup table to reference the second entry of the first snapshot pointer structure, wherein the first entry of the first snapshot lookup table is not updated.

The software further may include executable code that, in response to a request to create another snapshot of the first logical storage unit, creates a second snapshot lookup table for the first logical storage unit by copying contents of the current lookup table. The software may further include executable code that, in response to a request to link a target logical storage unit to the first logical storage unit for the first point in time, creates a target current lookup table, including copying contents of the first snapshot lookup table into the target current lookup table. The software may further include executable code that receives a read request for a first data portion of the target logical storage unit, and executable code that, in response to the read request, determines a physical storage location of the first data portion of the target data structure by accessing a first entry of the target current lookup table corresponding to the first data portion.

BRIEF DESCRIPTION OF THE DRAWINGS

Features and advantages of the present invention will become more apparent from the following detailed description of illustrative embodiments thereof taken in conjunction with the accompanying drawings in which:

FIG. 8 is a flowchart illustrating a method of creating snapshots, according to embodiments of the invention;

FIG. 10 is a flowchart illustrating a method of linking a target logical storage unit to a snapshot of a source logical storage unit, according to embodiments of the invention;

DETAILED DESCRIPTION OF EMBODIMENTS

Figure 1:
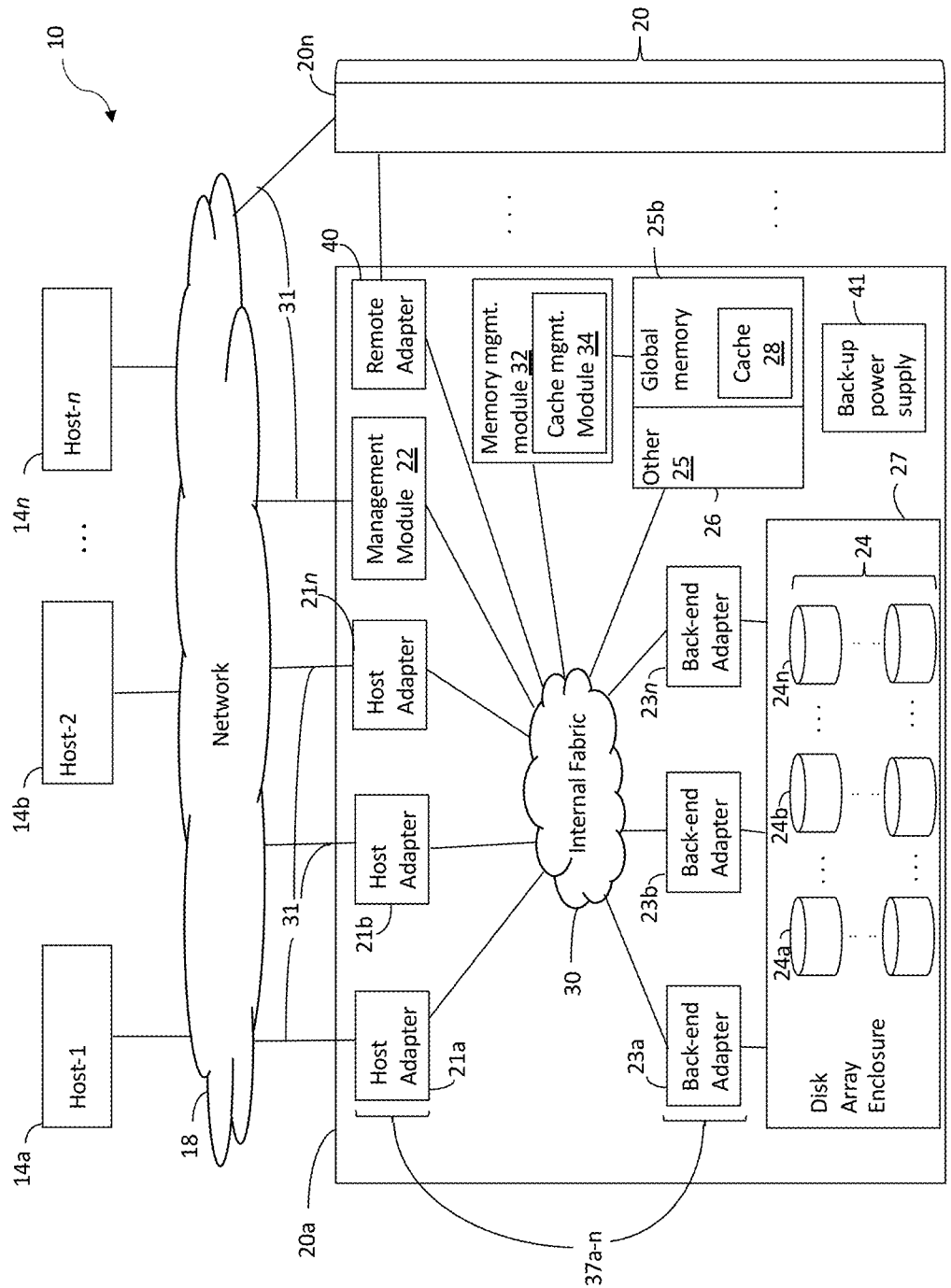
FIG. 1 is a block diagram illustrating an example of a data storage network, according to embodiments of the invention.

Known snapshot mechanisms, including the targetless snapshot mechanism described in the Jaganathan patent, may require maintaining data structures that consume significant amounts of memory on a data storage system. What's more, determining the location of data associated with a snapshot, for example, in response to a snapshot read operation, may consume significant computational (e.g., CPU) resources. For example, the Jaganathan patent describes two snapshot metadata structures, a replication data pointer (RDP) table and RDP binary tree for locating a storage location of data for a data portion (e.g., track) of an LSU for a snapshot. Using either one of these data structures to locate such a storage location may require several memory accesses, the number of such memory accesses based on the number of snapshots since the snapshot in question and the frequency with which writes occur between snapshots. The number of such memory accesses required and the amount of memory consumed by snapshot metadata structures may degrade system performance.

What may be desired is the ability to manage snapshots on a data storage system that requires fewer memory accesses and/or less memory resources than in known systems.

Described herein are techniques and mechanisms for managing snapshot metadata on a data storage system that generally require fewer memory accesses and may consume less memory than known snapshot management systems.

In some embodiments of the invention, a snapshot lookup table (SLT) and one or more snapshot pointer structures (SPSs) for a given LSU may be provided. Each of the one or more SPSs may correspond to a subset of the LSU referred to herein as a "zone", each entry in the SPS corresponding to a data portion of the LSU and a physical storage location at which data is stored for the data portion at a particular point in time of a snapshot. Some SPS entries may point to an LSU track table or other metadata structure representing a current state of the LSU, for example, if the SPS entry corresponds to a data portion of a snapshot that has not been overwritten by a later write operation. For example, the SPS entry may have been designated to an LSU data portion when a first snapshot of the LSU was taken (i.e., created), at which time the SPS entry may have been configured to point to the LSU track table entry corresponding to the data portion. There also may have been several later snapshots created for the LSU. In such embodiments, if there have been no write operations affecting the data portion since the creation of the first snapshot, then the SPS entry will still point to the LSU track entry even after creation of the later snapshots.

An SPS entry may point to an entry of a data structure other than the LSU track table (or the like) if a write operation has been for the data portion in question since the snapshot to which the SPS entry corresponds. For example, in response to a later write operation for the data portion (e.g., specifying the data portion or another data portion that includes the data portion), the data contents ("data") of the data portion stored at the physical storage location may be copied to another physical storage location (e.g., as part of a copy-on-write (COW) operation), for example, of a pre-allocated snapshot storage pool, and the SPS entry may be modified to point directly or indirectly to the copied-to physical storage location. In some embodiments, the SPS may be an indirect SPS (ISPS) in that each entry of the ISPS does not directly specify a physical storage location, but rather points to anther data structure that specifies the physical storage location or points to yet another data structure that directly or indirectly points to the physical storage location.

In some embodiments, a direct snapshot pointer structure (DSPS) may be provided. The DSPS may include a plurality of entries, each entry pointing directly to a physical storage location at which data for a data portion for a specific snapshot is stored. In such embodiments, in response to a data portion being copied to another physical storage location, an entry of the DSPS may be designated, and defined to point to such physical storage location and to associate the physical storage location with the data portion and/or an ISPS entry corresponding to the data portion. The current ISPS entry for the data portion may be updated to point to the DSPS entry.

In some embodiments, each time a first write to a data portion is made following creation of a snapshot: the data of the data portion may be copied to another physical storage location as described above; a DSPS entry may be updated to point to such physical storage location and to associate the DSPS entry with the ISPS entry currently (i.e., when the write operation was received) associated with the data portion of the most recent snapshot; and such ISPS entry may be updated to point to the DSPS entry. In addition, another ISPS entry may be designated to the data portion and updated to point to the LSU track table entry for the data portion.

In some embodiments, a DSPS may be allocated for a zone of an LSU upon creation of the LSU or, if the LSU is target LSU, the linking of the target LSU to a source LSU as described in more detail herein. In alternative embodiments, an ISPS may be allocated for a zone of an LSU in response to first snapshot being created for an LSU, or, in the case of a target LSU, in response to a first write operation to a data portion of the zone.

An SLT may be created for each snapshot of an LSU, each entry of an SLT corresponding to a data portion of the LSU and including a reference (e.g., pointer) to an entry in an SPS, for example, an ISPS entry. An SLT may be used to link a target LSU to a snapshot of a source LSU, as described in more detail elsewhere herein.

In some embodiments, a current lookup table (CLT) may be provided for an LSU, the CLT corresponding to a current time of the storage system. The CLT may include a plurality of entries, each entry of the CLT corresponding to a respective data portion of the LSU and including a reference (e.g., pointer) to a respective entry of an SPS (e.g., ISPS). For example, each time a first write following the creation of a snapshot is made to a data portion of the LSU, the entry in the CLT corresponding to the data portion may be updated to point to the entry in the ISPS that was updated to point to LSU track table entry. The CLT may be accessed to determine a storage location of a data portion, for example, in response to a read operation for a target LSU snapshot (i.e., a "target read") as described in more detail elsewhere herein. In some embodiments, the storage location of a data portion of a target may be determined from as few as three memory accesses. For example, the entry in a CLT corresponding to the data portion may be accessed, from which an ISPS entry may be determined. The ISPS entry then may be accessed to determine an LSU track table entry or a DSPS entry corresponding to the data portion for the particular snapshot. The data for the data portion then may be accessed from the physical storage location specified by the LSU track table entry or the DSPS entry.

In some embodiments, each time an instruction is received to create a snapshot, a next SLT is created, and the contents of the CLT are copied to the newly created SLT, as described in more detail herein. That is, each SLT of an LSU may be derived from the CLT of the LSU at the time the SLT is created.

In some embodiments, when it desirable to access (e.g., read and write) data of a snapshot of a first LSU, a second LSU (referred to herein as a "target LSU") may be linked to the snapshot of the first LSU (the "source LSU" in this context). Such linking may include generating a CLT for the target LSU by copying the contents of the SLT of the snapshot to which the target LSU is being linked, as described in more detail elsewhere herein. Initially, each entry in the target CLT may point to the same ISPS entry as the ISPS entry pointed-to by the corresponding entry of the SLT from which the target CLT was copied, such that location of data of the target LSU initially may be determined from the ISPS pointers copied from the SLT of the snapshot into the CLT of the target LSU.

In some embodiments, in response to a first write to the target LSU since the target LSU was linked to a snapshot, a target LSU track table may be created (e.g., instantiated) for the target LSU. Prior to such a write, it may be desirable to not create an LSU track table for the target LSU to conserve memory space, as the target LSU initially has no data unique to the target LSU, as the target LSU is initially a copy of the snapshot to which it is linked.

In some embodiments, for any given zone of the target LSU, an ISPS specific to the target LSU zone may not be allocated until a first write to a data portion of the zone following the linking of the target LSU, e.g., regardless of the number of snapshots created for the target LSU. Prior to such a write, it may be desirable to not allocate an ISPS to the LSU zone to conserve memory space, as until a write is made to the zone, all of the data portions of the zone are copies of the zone of the source LSU at the time of the snapshot; as such, the location of data of the each data portion of the zone and can be determined from the ISPS pointers copied from the SLT of the snapshot into the CLT of the target LSU.

For a specific data portion of the target LSU, in response to a first write to the data portion since the linking of the target LSU: a next available ISPS entry of the target LSU zone of the data portion may be designated for the data portion; the designated ISPS entry may be updated to point to the target LSU track table entry for the data portion; and the corresponding target LSU CLT entry may be updated to point to designated ISPS entry. Further, in response to a first write to a data portion since linking the target LSU, a track table entry may be populated for the data portion. Prior to such a first write to the data portion, it may be desirable to not populate the LSU track table entry for the data portion to conserve memory space, as the data portion initially has no data unique to the target LSU, as the target LSU CLT entry for the data portion initially points to an ISPS entry of the source LSU, which points to either a LSU track table entry or a DSPS entry for the source LSU.

In some embodiments, target snapshots (i.e., snapshots of target LSUs) may be created in a same or similar manner as snapshots for non-target LSUs are created, as described above and in more detail elsewhere herein. Further, in response to a write operation to the target LSU (except for in response to a first write since the linking of the target LSU to a target LSU, target LSU zone or target LSU data portion as described above), target snapshot metadata may be managed in a same or manner as described herein for write operations to non-target LSUs.

In some embodiments, performing a read operation for a data portion of a target LSU may include determining whether the data portion was overwritten since a last snapshot—i.e., whether a write was performed for the data portion after the snapshot was created. If the data portion was overwritten, then normal read processing using the LSU track table of the target LSU may be performed. If it is determined that the data portion was not overwritten since the last snapshot, the target LSU CLT may be accessed to determine the ISPS entry for the data portion for the snapshot in question, from which the storage location of data portion ultimately may be determined, as described in more detail elsewhere herein.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (IO) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of IO operations in accordance with different tasks and applications executing on the hosts. In the embodiment of FIG. 1, any one of the host computers 14a-n may issue an IO request to the storage system 20a to perform an IO operation. For example, an application executing on one of the host computers 14a-n may perform a read or write operation resulting in one or more IO requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of IO requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all IO communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for IO communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing IO operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform IO operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
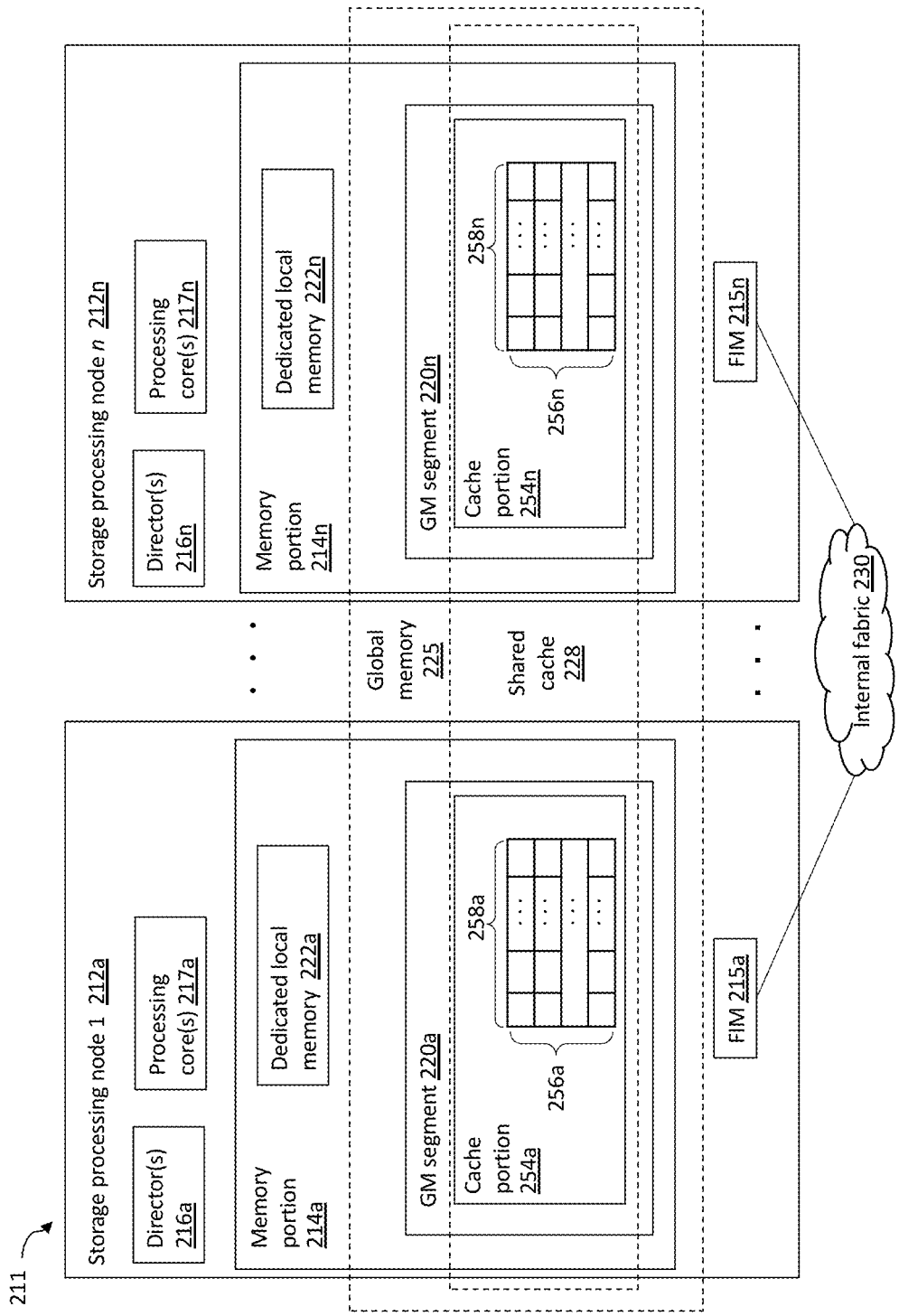
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix®, VMAX®, VMAX3® or PowerMax™ systems made available from Dell EMC.

Host systems 14a-n may provide data and control (e.g., management and access control) information to storage systems 20a-n over a plurality of IO paths defined between the host systems and storage systems, for example, including host system components, storage system components, and network components (e.g., of network 18), and the storage systems also may provide data to the host systems across the IO paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing IO operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store IO data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process IO on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
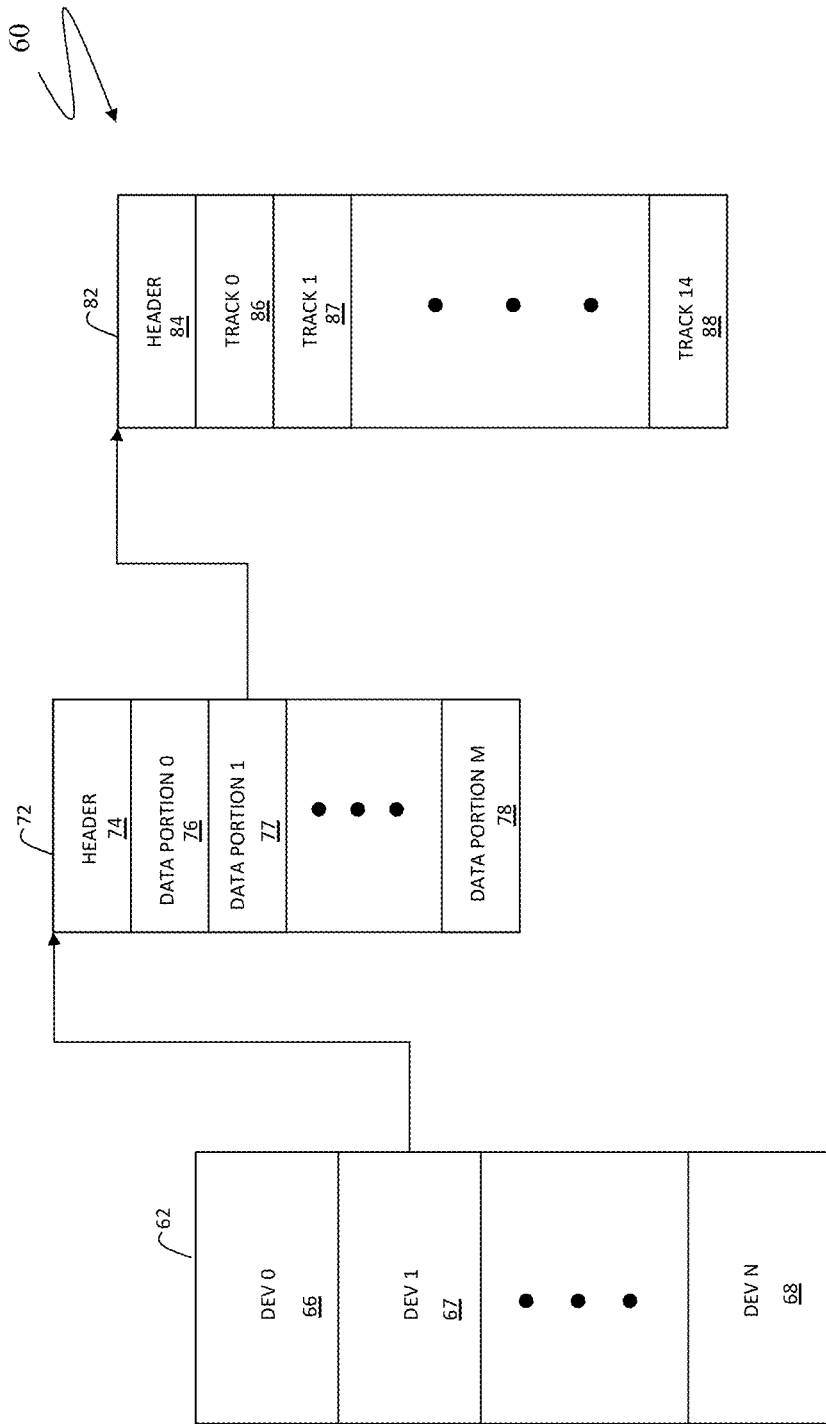
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20*a* (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein.

Figures 3B, 3C:
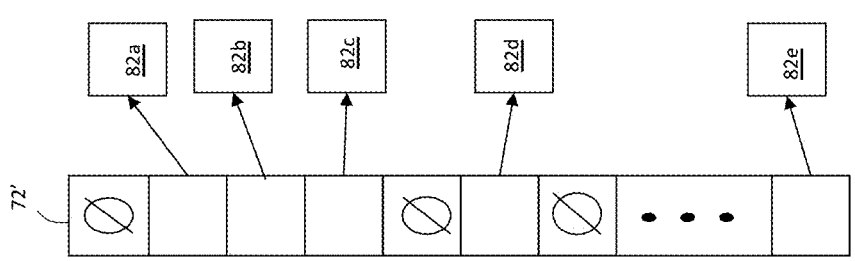
FIG. 3B a block diagram illustrating an example of a table used for a thin logical device, according to embodiments of the invention.
FIG. 3C is a block diagram illustrating an example of a data structure for mapping logical storage unit tracks to cache slots, according to embodiments of the invention.

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82*a*-82*e*. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 3C is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an IO operation can be mapped to one or more cache slots. Further, using the same data structures, the one or more physical address ranges corresponding to the one or more LSU tracks of the LSU may be mapped to one or more cache slots.

Storage systems (e.g., the storage system 20*a*) also may maintain data structures (e.g., masking tables) that define IO connectivity in terms of LSUs, storage ports and host ports; i.e., which ports of a host system ("host ports"; e.g., SCSI initiators) are permitted to perform IO communications with which LSUs (e.g., identified with, and sometimes referred to as, a Logical Unit Numbers (LUNs)) over which ports of a storage system ("storage ports" e.g., SCSI targets). Defining (including initially defining and later modifying) which host ports are permitted to perform IO communications with which LSUs over which storage ports, for example, using a masking table or other data structure, may be referred to as configuring or defining IO connectivity between a host port, storage port and LSU, or more simply as "masking."

The tables 62, 72, 72', 82 and 300 of FIGS. 3A-3C may be stored in the GM 26 of the storage system 20*a* during operation thereof and may otherwise be stored in non-volatile memory (i.e., with the corresponding physical storage device). In addition, tables corresponding to LSUs accessed by a particular host may be stored in local memory of the corresponding one of the FAs 21*a*-*n*. In addition, RA 40 and/or the BEs 23*a*-*n* may also use and locally store portions of the tables 62, 72, 72', 82 and 300. Other data structures may be stored in any of GM 25*b*, memory 25*a*, GM segment 220*a*-*n* and/or dedicated local memories 22*a*-*n*.

In some embodiments of the invention, snapshots may be employed, for example, targetless snapshots as described in the Jaganathan patent. In such embodiments, targetless snapshot (TS) data structures such as a replication pointer table, a replication pointer tree, a data pool, a snapshot table and a sequence number pointer table may be employed. Some of these TS data structures will now be briefly described, and may be used in embodiments of the invention.

Figures 4, 5, 6:
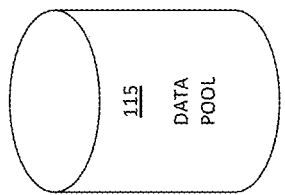
FIG. 4 is a block diagram showing a snapshot data pool, according to embodiments of the invention.
FIG. 5 is a block diagram showing a snapshot table, according to embodiments of the invention.
FIG. 6 is a block diagram showing a sequence number table, according to embodiments of the invention.

Referring to FIG. 4, a snapshot data pool 115 includes storage for data that is moved in connection with managing snapshots. Data stored in the snapshot data pool 115 may be pointed to by the pointers provided in other snapshot metadata data structures described herein. In some embodiments, the snapshot data pool 115 is provided in a single logical and/or physical location. In other embodiments, the snapshot data pool 115 may be distributed and/or may use more than one physical and/or logical data storage element. Providing data to the snapshot data pool 115 is discussed in more detail in the Jaganathan patent.

Referring to FIG. 5, a snapshot table 120 includes a plurality of entries corresponding to particular snapshots. Each of the entries includes a snapshot ID and a sequence number. The snapshot ID may be used to identify a particular snapshot and could be text (e.g., "Mar. 12, 2014, 8:00 am snapshot") or could be a token that is used by other software (not shown herein) to identify each of the snapshots. The sequence number (SN) provided with each of the snapshots is used in connection with managing snapshots, as described in more detail elsewhere herein and/or as described in the Jaganathan patent.

Referring to FIG. 6, a sequence number (SN) table 130 is shown as having a plurality of entries. Each of the entries of the table 130 may contain an SN, described in more detail elsewhere herein. The table 130 may contain a single entry for each data portion (or other appropriate data increment) of the logical device (e.g., thin logical device) for which snapshots are being provided. Thus, for example, if there are one hundred data portions in a logical device, there may be one hundred entries for sequence numbers in the table 130. Use of the sequence number table 130 and of SNs is described in more detail elsewhere herein and in the Jaganathan patent.

Figure 7:
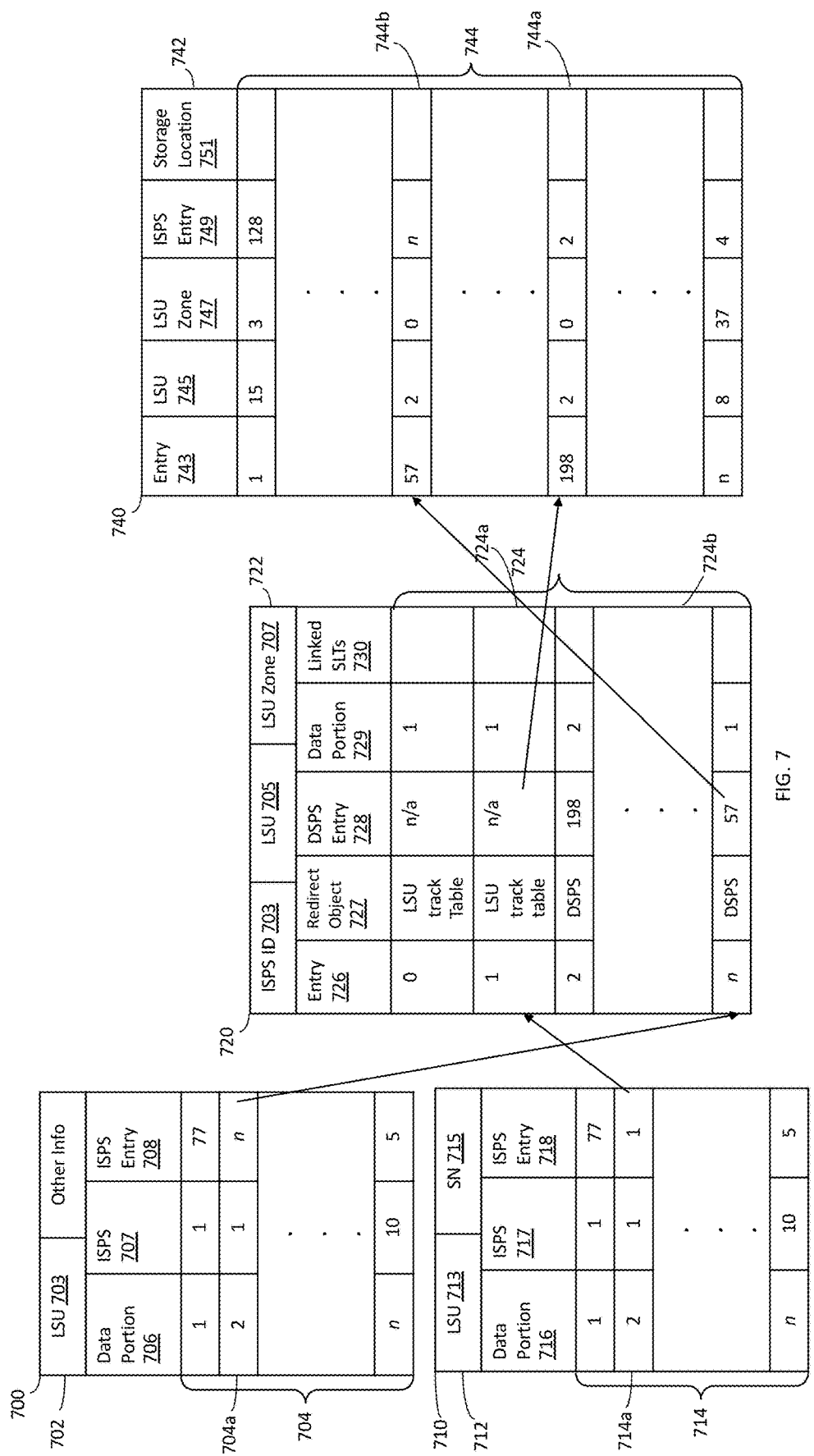
FIG. 7 illustrates data structures for managing snapshot metadata, according to embodiments of the invention.

FIG. 7 illustrates data structures for managing snapshot metadata, according to embodiments of the invention, including CLT 700, SLT 710, ISPS 720 and DSPS 740. Other embodiments of data structures for managing snapshot metadata, for example, variations of the data structures 700, 710, 720 and 740, are possible and are intended to fall within the scope of the invention. For example, in some embodiments, one or more of the data structures or portions thereof may be combined with one another and/or other data structures described herein. For example, for a given LSU, at least parts of a CLT, a plurality of SLTs and/or a plurality of ISPSs may be combined with an LSU track table 82, snapshot table 120 and/or SN table 130 in a single data structure or in multiple data structures in which information is configured in a different manner.

The CLT 700 may include a header 702 that includes an LSU ID 703 and other information. The CLT 700 may include a plurality of entries 704, where each entry may include the following values: a data portion ID in a data portion ID column 706; an ISPS ID in an ISPS column 707; an ISPS entry ID in an ISPS entry ID column 708; and other information. The data portion ID of an entry may specify an ID of a data portion of the LSU corresponding to the CLT 700. In some embodiments, in which data portions have a predetermined size (e.g., 128 KB), the data portion ID may simply specify a position of a data portion within a predefined order of data portions within the LSU. For example, a data portion may have an ID of 724 meaning it is in the 725th (e.g., if the first position in position is 0) position; i.e., position 724 of the LSU. In some embodiments, an explicit data portion ID may not need to be specified in an entry of a CLT (and/or an SLT), as the ordered position of the entry in the LSU may serve as the data portion ID, e.g., if the CLT and/or SLTs, respectively, are integrated as part of the LSU track table of the LSU. For example, the entry 704a specifies a data portion ID="2".

The ISPS ID of an entry of the CLT 700 entry may specify an ID of the ISPS table corresponding the data portion, e.g., the ISPS table corresponding to a zone of the LSU that includes the data portion. For example, the entry 704a specifies an ISPS ID="1" of ISPS 720. The ISPS entry ID of an entry of the CLT 700 entry may specify an ID of ISPS table entry corresponding to the data portion, e.g., the ISPS table entry corresponding to a zone of the LSU that include the data portion. For example, the entry 704a specifies (e.g., includes a pointer to) an ISPS ID entry 724b="n". In some embodiment of the invention, each of the entries 704 of the CLT also may include a sequence number (SN) of the data portion represented by the entry (not shown), the SN corresponding to a snapshot of the LSU as described more detail elsewhere herein. In some embodiments, the CLT 700 may be integrated with the SN table 130 of the LSU. Use of the CLT 700 to manage snapshots is described in more detail elsewhere herein.

The SLT 710 may be configured in a similar manner to the CLT 700. The SLT 710 may include a header 712 that includes an LSU ID 713 and an SN of the snapshot (e.g., as defined in snapshot table 120). The SLT 710 may include a plurality of entries 714, where each entry may include the following values: a data portion ID in a data portion ID column 716; an ISPS ID in an ISPS column 717; an ISPS entry ID in an ISPS entry ID column 718; and other information. The data portion ID of an entry may specify an ID of a data portion of the LSU corresponding to the SLT 710. In some embodiments, in which data portions have a predetermined size (e.g., 128 KB), the data portion ID may simply specify a position of a data portion within a predefined order of data portions within the LSU, or the ordered position of the entry in the LSU may serve as the data portion ID, as described above in relation to entries 704 of the CLT 700. For example, the entry 714a specifies a data portion ID="2".

The ISPS ID of an entry of the SLT 710 entry may specify an ID of the ISPS table corresponding the data portion, e.g., the ISPS table corresponding to a zone of the LSU that includes the data portion. For example, the entry 714a specifies an ISPS ID="1" of ISPS 720. The ISPS entry ID of an entry of the CLT 710 entry may specify an ID of ISPS table entry corresponding to the data portion, e.g., the ISPS table entry corresponding to a zone of the LSU that include the data portion. For example, the entry 714a specifies (e.g., includes a pointer to) an ISPS ID entry 724a="1". Use of the SLT 710 to manage snapshots is described in more detail elsewhere herein.

The ISPS 720 may include a header 722, which may include an ISPS ID 703, LSU ID 705 and LSU Zone 722. Each ISPS 720 may correspond to a predefined subset (zone) of an LSU, for example, a logical block address (LBA) range of the LSU. The ISPS 720 may be allocated a certain amount of memory space, which may be a predefined amount, for example, large enough to accommodate management of metadata for the ISPS 720 (at least initially) according to embodiments of the invention described herein. Additional memory space may be allocated to the ISPS as needed. Upon initial allocation of the ISPS, entries 724 thereof may be initialized as "free" or "unused" and then populated with pointers to LSU track table entries or DSPS entries, as described in more detain herein.

The ISPS 720 may include a plurality of entries 724, each entry corresponding to a data portion of an LSU at a current time or at a point in time of a snapshot of the LSU, and may be used to locate the physical storage location of a data portion during a target read as described in more detail herein. Each of the entries 724 may include: an ISPS entry ID in an ISPS entry ID column 726; a redirect object type in an redirect object type column 727; a DSPS entry ID in a DSPS entry ID column 728; a data portion ID in a data portion ID field 729, SLTs that are linked to the entry in a Linked SLTs column 720, and other information. SLTs in the Linked SLTs may specify SNs of the snapshots whose SLTs specify the ISPS entry, and may be used for any of a variety of purposes for which such knowledge may be useful when managing snapshots. The redirect object type may specify whether the entry points to an entry in the LSU track table of the LSU corresponding to the ISPS 710 or a DSPS entry. If the entry is a type that points to an entry of the LSU track table, the memory location of the LSU track table entry may be determined from the LSU ID 705 specified in the header and the data portion ID specified by the entry. Alternatively, the entry may simply include a pointer to the LSU track table entry (e.g., in a column not shown in FIG. 7).

If an entry of the ISPS 720 is a type that points to an entry of the DSPS, the DSPS entry may be specified in the DSPS entry column 728 of the entry, for example, as a pointer to the DSPS entry. For example, the entry 724a points to an entry 744a of the DSPS 740, and an entry 724b points to an entry 744b of the DSPS 740. In some embodiments, rather than a column dedicated to DSPS entries, the column 728 may be used to include a pointer to a DSPS entry or LSU track table entry, for example, depending on the value in the redirect object column 727 for the entry. In its simplest form, each entry of the ISPS 720 may merely include a pointer to an LSU track table entry or a DSSP entry. Use of the ISPS 720 to manage snapshots is described in more detail elsewhere herein.

The DSPS 740 may be used to specify physical storage locations of data portions corresponding to snapshots of an LSU, where such data portions of have been overwritten since the snapshot was taken—e.g., since an SLT was created for the snapshot. Each entry of the DSPS 740 may be used to associate a physical storage location to a data portion of a snapshot. In some embodiments described herein, the DSPS 740 is a global (i.e., storage system-wide) data structure that specifies physical storage locations for multiple (e.g., all) LSUs on the storage system. However, in some embodiments, separate DSPSs 740 may be provided for each LSU or different subsets of LSUs on the system.

The DSPS 740 may include a plurality of entries 744, where each entry may specify an entry ID in an entry ID column 743, an LSU ID in an LSU ID column 745, an LSU zone ID in an LSU zone ID column 747, an ISPS entry ID in an ISPS column 749 and a storage location in storage location column 751. The LSU ID and the LSU Zone ID of a data portion may specify the LSU and LSU zone to which the data portion belongs, which may be used to determine which ISPS 720 corresponds to the DPS entry. Alternatively, an ISPS ID of the ISPS 720 may be specified. The ISPS entry ID specified in a DSPS entry may specify the entry of the ISPS corresponding to the DSPS entry; i.e., the ISPS entry that points to the DSPS entry.

The storage location of a DSPS entry may specify a physical storage location of the data portion, for example, a physical storage device (PSD) and LBA address range thereof (e.g., a starting LBA and offset). This storage may have been allocated from the snapshot data pool 115 in response to a first write to a data portion following creation of a snapshot of the LSU of the data portion, as described in more detail elsewhere herein. In its simplest form, an entry of the DSPS 740 may only include a pointer to the storage location specified in the storage location column 751. Use of the DSPS 720 to manage snapshots is described in more detail elsewhere herein.

FIG. 8 is a flowchart illustrating a method 800 of creating snapshots, according to embodiments of the invention. Other embodiments of a method of creating snapshots, for example, variations of the method 800, are possible and are intended to fall within the scope of the invention. Prior to creation of an initial (i.e., first in time) snapshot for the LSU, a CLT (e.g., 700) may have been created for the LSU, for example, when the LSU was initially created or in response to determining that snapshots will be maintained for the LSU.

In a step 802, a request is received to create a snapshot for an LSU, for example, in response to an event (e.g., user input), or per a predefined schedule (e.g., periodically). In a step 804, an SLT (e.g., 710) may be created for the snapshot, for example, including copying contents of entries of a CLT of the LSU into the corresponding entries of the SLT. In some embodiments, if the snapshot is an initial snapshot for the LSU, and a CLT was not previously created, the CLT may be created in parallel to the SLT, or the CLT may be first created and the contents copied as part the step 804. In a step 806, if it is determined that the snapshot is an initial snapshot of the LSU, one or more ISPSs (e.g., 720) may be allocated to LSU.

In a step 808, the SN for the LSU may be incremented to produce a new SN for the LSU. For example, a new entry may be made to the snapshot table 120, the new entry including the incremented SN. The SN for the individual data portions of the LSU, however, remain unchanged. For example, the SN specified in each entry of the SN table 130 is not incremented as a result of the creation of the new snapshot, resulting in the SN of each data portion being less than (i.e., not equal to) the SN of the LSU, which may impact how snapshot metadata is managed in response to write operations or target read operations (i.e., a read of a target LSU), as described in more details below.

Figure 9A:
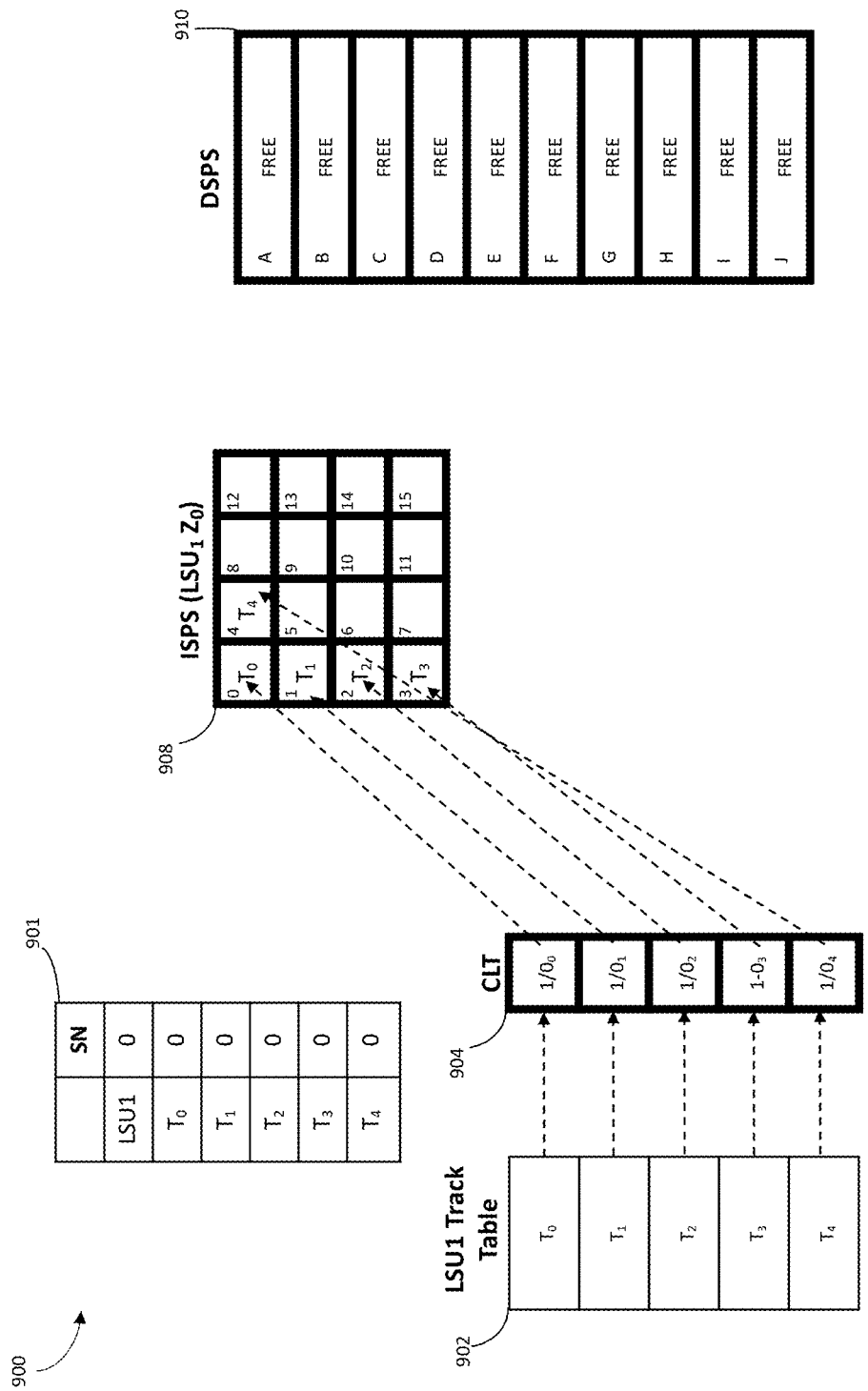
FIGS. 9A-9D illustrate examples of managing snapshot metadata in response to creating snapshots, according to embodiments of the invention.

FIGS. 9A-9D illustrate examples of managing snapshot metadata in response to creating snapshots, according to embodiments of the invention. FIG. 9A includes a plurality of data structures 900, including an LSU track table 902 for an LSU named "LSU1"; a CLT 904 for LSU1; an ISPS 908 for Zone® of LSU1; and a DSPS 910. FIG. 9A also includes an SN table 901 that is a variation of SN table 130, the difference being that the SN table 901 also includes the current SN of the LSU1. In practice, the LSU1 value may reside in a difference data structure, but data structure 901 will be used for illustrative purposes.

In FIG. 9A, and in FIGS. 9B-9D, 11, 13A-E, 14A, 14B, 15A and 15B, the following nomenclature is used. LSU track ID table entries are illustrated as $T_i$, where i=the LSU track table entry representing a data portion. CLT and SLT entries are illustrated in the following format: "A/B", where A=ISPS ID and B=ISPS entry. An ISPS entry illustrated as a blank entry or with a value of "F" (free) are ISPS entries that have been allocated for use, but have not yet been designated or have been cleared. ISPS entries also may be in the following format: "MN", where M=the redirection object, having a value of either "D" or DSPS or "T" for LSU track table; and N=the entry in the DSPS or LSU track table (e.g., the data portion entry). Further, the values indicated in upper left-hand corner of each ISPS entry represents the entry ID of the entry. DSPS entries may be illustrated with a value of "FREE" indicating that the entry has not been allocated for an overwritten data portion for a snapshot yet, or illustrated in the following format: "$LSU_X/Z_Y/I_Z$", where X=LSU ID, Y=LSU Zone ID and Z=ISPS entry. The capital letter at the left of each DSPS entry represents the entry ID of the entry.

For ease of illustration, LSU track tables (e.g., 902), CLTs (e.g., 904) and SLTs are shown as having only five entries, ISPSs are illustrated as having only sixteen entries and DSPS 910 is shown as having only ten entries. It should be appreciated that each of these data structures may have less or significantly more entries.

As illustrated in SN table 901, as no snapshot has been created yet, the SN numbers of the LSU1 and data portions are all initialized to same value, 0. Each entry in the CLT 904 may represent a data portion of LSU1 and, as illustrated by dashed lines between entries of the LSU track table 902 and the CLT 904, may correspond to a respective entry of the LSU track table 902. FIG. 9A may represent a state of the data structures 900 for a data storage system (e.g., 20a) prior to creation of an initial snapshot for LSU1, but where the CLT 904 has already been created, the ISPS 908 has already been allocated and entries 0-4 thereof designated to respective CLT 904 entries. The CLT entries have pointers to their respective ISPS entries. As no snapshots have been created, and thus no snapshot data (i.e., of a data portion) overwritten yet, each of ISPS entries 0-4 point to the LSU track table 902. All of the entries of the DSPS 910 are indicated as being free, which means that currently there are no overwritten snapshot data on the storage system.

Figure 9B:
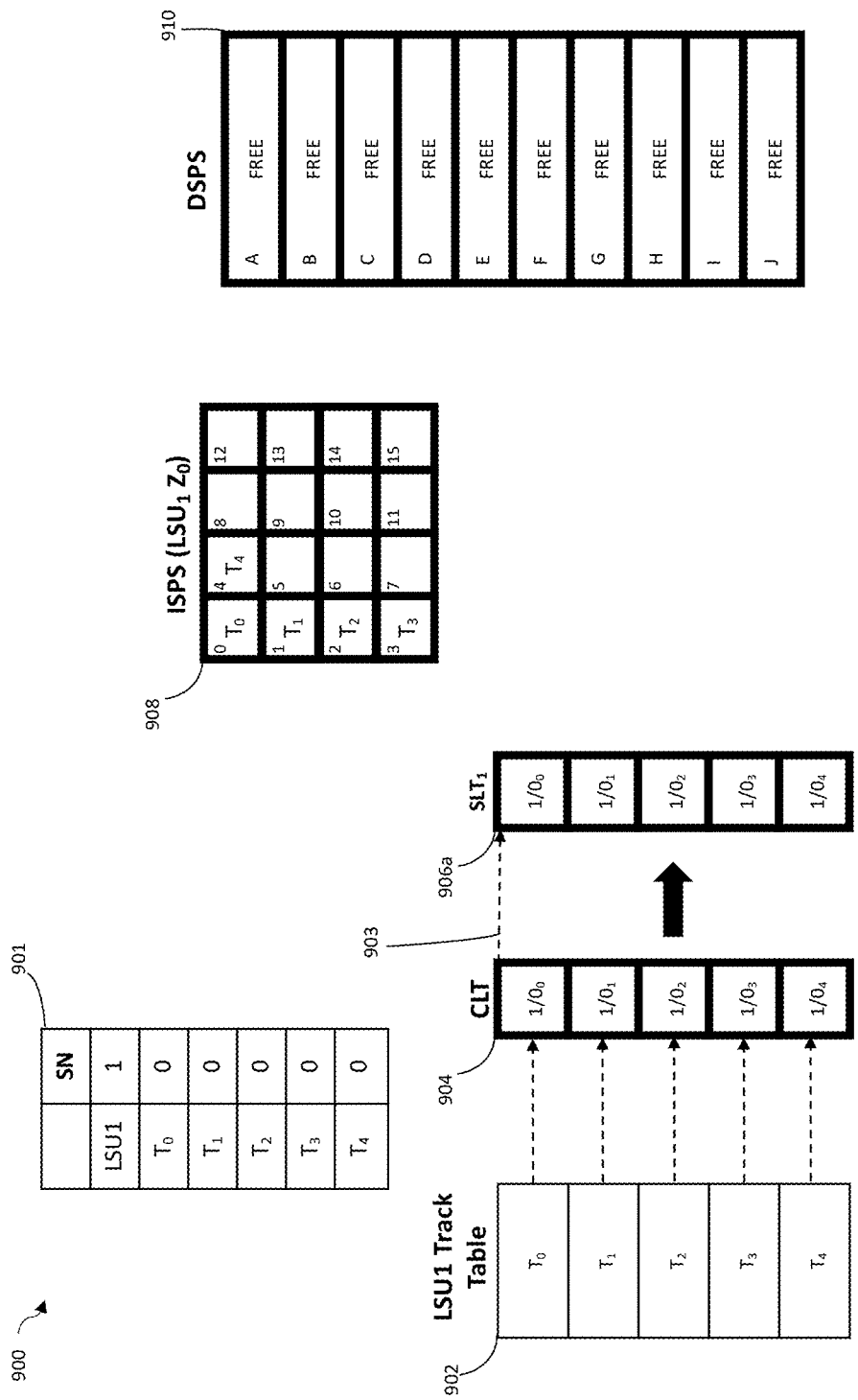

FIG. 9B illustrates the data structures 900 after an initial (first) snapshot of LSU1 has been created, resulting in the creation of the SLT1 906a. SLT1 906a is derived from the CLT 904, including copying the contents of the CLT 904 entries to respective SLT1 906a entries. The value of SN for LSU1 in the SN table 901 has been incremented to 1, while the SNs of the data portion entries remain at 0. No other data structures 900 are affected by the creation the first snapshot.

Figure 9C:
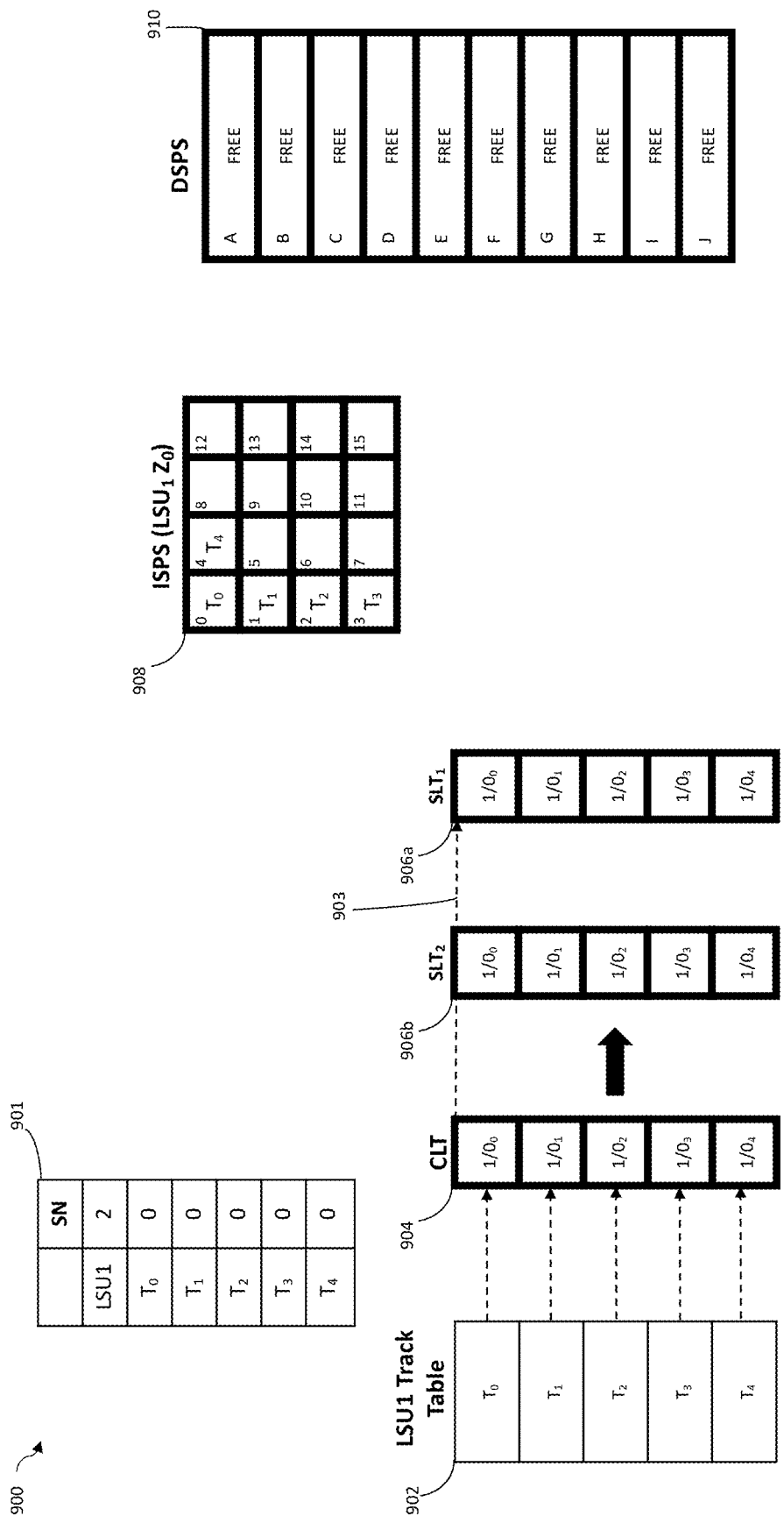

FIG. 9C illustrates the data structures 900 after a second snapshot of LSU1 has been created, resulting in the creation of the SLT2 906b. SLT2 906b is derived from the CLT 904, including copying the contents of the CLT 904 entries to respective SLT2 906b entries. The value of SN for LSU1 in the SN table 901 has been incremented from 1 to 2, while the SNs of the data portion entries remain at 0. No other data structures 900 are affected by the creation the second snapshot.

Figure 9D:
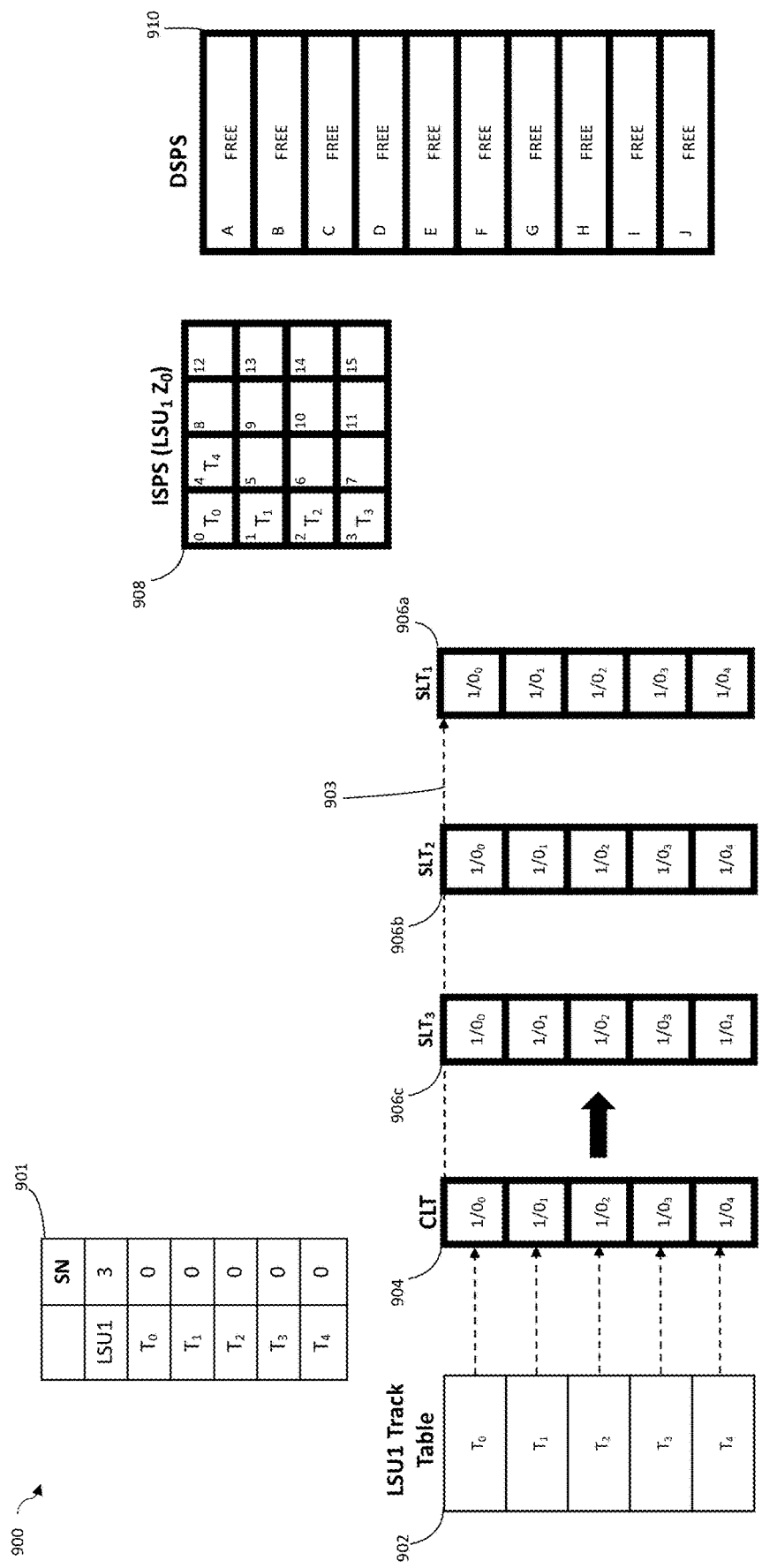

FIG. 9D illustrates the data structures 900 after a third snapshot of LSU1 has been created, resulting in the creation of the SLT3 906c. SLT3 906c is derived from the CLT 904, including copying the contents of the CLT 904 entries to respective SLT3 906c entries. The value of SN for LSU1 in the SN table 901 has been incremented from 2 to 3, while the SNs of the data portion entries remain at 0. No other data structures 900 are affected by the creation the third snapshot.

In FIGS. 9A-9C, dashed line 903 illustrates that a familial relationship (e.g., lineage) may be maintained between the SLTs 906a-906c and CLT 904 of an LSU. For example, each of these data structures and/or another data structure may maintain information about the lineal relationship between SLTs and a CLT of an LSU. This familial lineage information may be used for any of a variety of purposes, for example, to determine all SLTs affected by a write to a data portion.

FIG. 10 is a flowchart illustrating a method 1000 of linking a target logical storage unit to a snapshot of a source logical storage unit, according to embodiments of the invention. Other embodiments of a method of linking a target logical storage unit to a snapshot of a source logical storage unit, for example, variations of the method 1000, are possible and are intended to fall within the scope of the invention. In a step 1002, a request may be received to link a target LSU to a snapshot of a source LSU, for example, for the purpose of accessing (e.g., reading and/or writing) data for a particular snapshot, for example, for quality assurance testing, software development and/or troubleshooting a problem (e.g., a perceived bug) with an application. The target LSU may be a newly created LSU, or a previously existing LSU re-purposed for accessing the snapshot of the source LSU.

In a step 1003, an SN of the target SN may be incremented, whereas the SN of the data portions of the target LSU may not be incremented for reasons that should be clear from descriptions of write and read operations provided herein. In a step 1004, a CLT may be created for the target LSU, and in a step 1006, the entries of the SLT for the snapshot of the source LSU may be copied into corresponding entries of the target LSU CLT. Thus, initially, the ISPS entries pointed to by the target LSU CLT will be the ISPS entries of the source LSU pointed-to by the source LSU SLT from which the entries were copied. In some embodiments, an LSU track table may not be created (e.g., instantiated) for the target LSU until a write is made to the target LSU, and an ISPS may not be allocated for a zone of the target LSU until a write is made to a data portion included in the zone.

Figure 11:
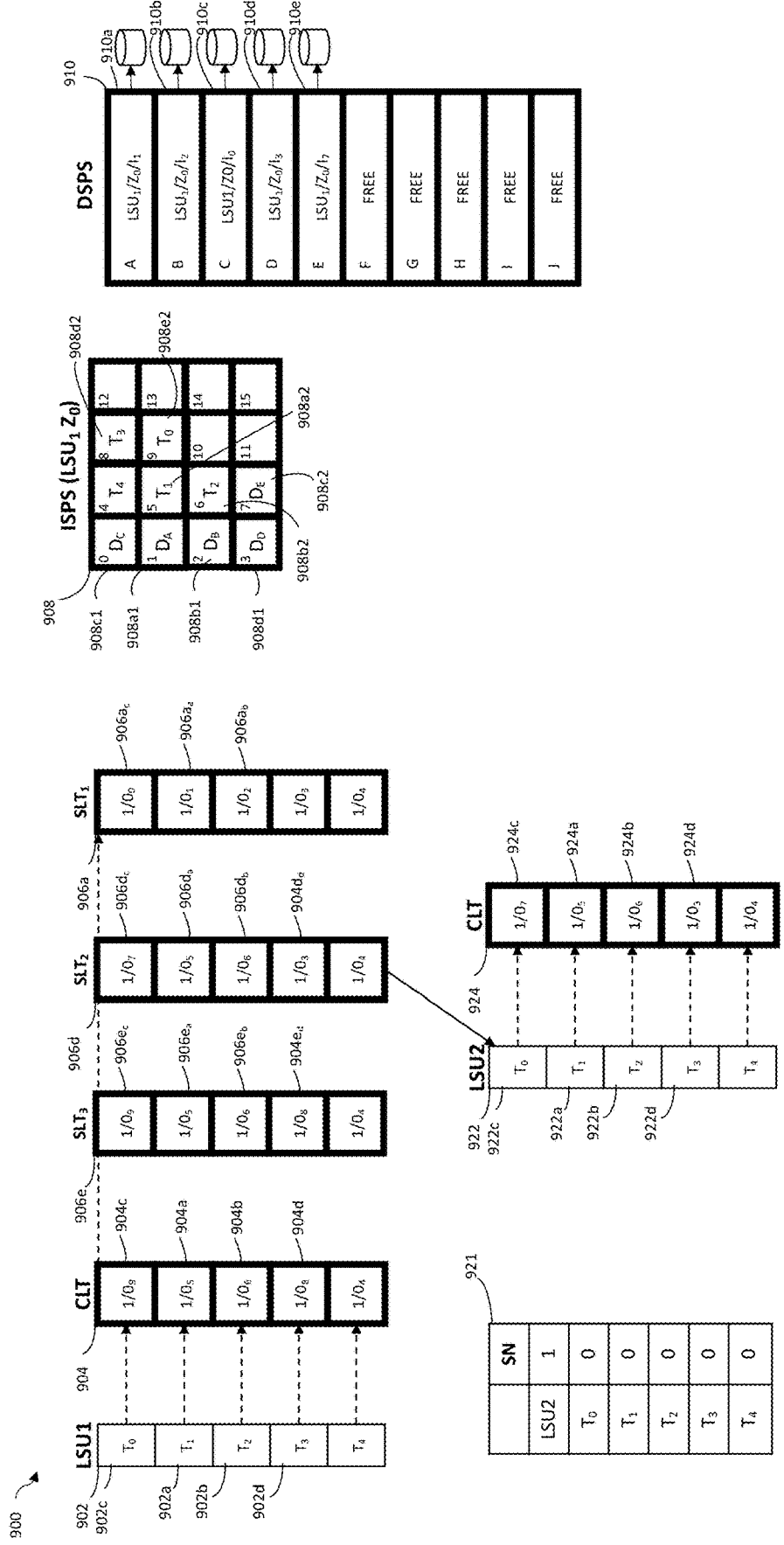
FIG. 11 illustrate an example of linking a target logical storage unit to a source logical storage unit, according to embodiments of the invention.

FIG. 11 illustrates an example of linking a target LSU, LSU2, to a second snapshot, represented by SLT2 906d, of a source LSU, LSU1. The data structures 902, 904, 906a, 906d, 906e, 908 and 910 are in a state reflective of several write operations having been performed on LSU1, as described in more detail elsewhere herein in relation to FIGS. 13A-13E. In some embodiments, these data structures are not affected by the linking.

In the example of FIG. 11, the target LSU is a new LSU for which the SNs of the target LSU and data portions were initialized to 0. In response to the linking, the SN of LSU2 may be incremented, whereas the SNs of the data portions remain unchanged, as illustrated by sequence number table 921 of LSU2. Further, a CLT 924 may be created for LSU2 and the contents of the entries of SLT2 906d copied into respective entries of the target LSU CLT 924.

As no writes have yet been made to the target LSU2, an LSU track table may not be created for the LSU2 to conserve memory space. In other embodiments, an LSU track table 922 may be created, and is included in FIG. 11 for illustrative purposes, in particular to illustrate the relationship between LSU data portions and entries of the CLT 924. Further, as reflected in FIG. 11, as no writes have yet been made to any data portions of LSU2, no ISPSs have yet been allocated to LSU2, for example, to conserve memory space.

Figure 12:
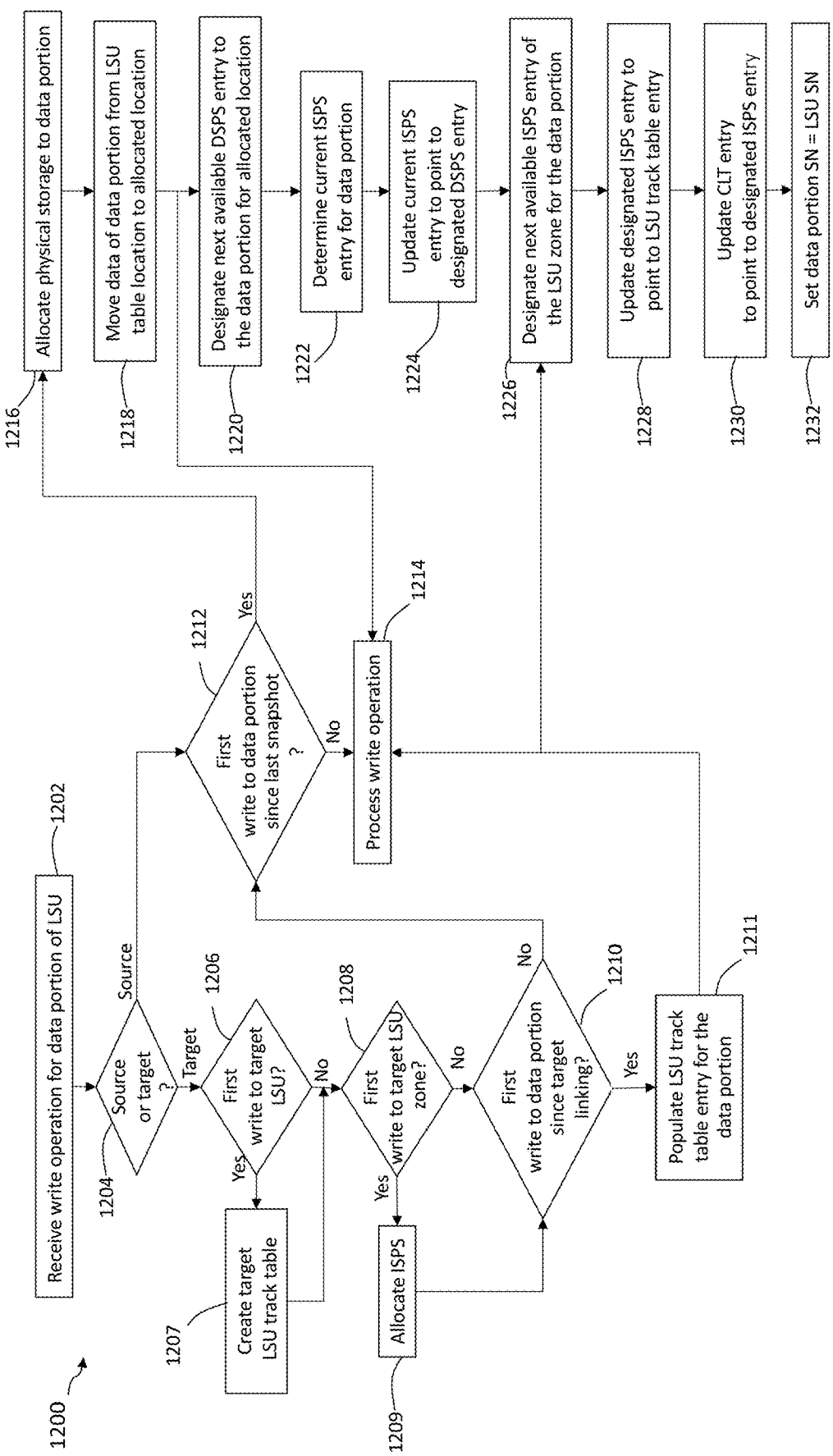
FIG. 12 is a flowchart illustrating a method of managing snapshot metadata in response to a write operation, according to embodiments of the invention.

FIG. 12 is a flowchart illustrating a method 1300 of managing snapshot metadata in response to a write operation, according to embodiments of the invention. Other embodiments of a method of managing snapshot metadata, for example, variations of the method 1000, are possible and are intended to fall within the scope of the invention. Throughout the description of the method 1200, references will be made to the illustrative data structures of FIGS. 13A-E, 14A, 14B, 15A and 15B.

In a step 1202 a write operation for a data portion of an LSU may be received, for example, from a host system. In a step 1204, it may be determined whether the LSU is a source (i.e., non-target) LSU or a target LSU. If the LSU is a source LSU, then in a step 1212, it may be determined whether the write operation is a first write to the data portion since a last snapshot for the LSU was created. In some embodiments, this determination is made by comparing the SN of the data portion to the SN of the LSU. If the LSU SN=the data portion SN, then a first write has already been made to the data portion; and if the LSU SN>the data portion SN (i.e., LSU SN is not equal to the data portion SN), a first write to the data portion has not been made since a last snapshot was created for the LSU, and thus the current write operation is the first write operation to the data portion since a last snapshot. As described elsewhere herein, when the LSU is initialized, the SN of the LSU and the SN of the data portions thereof may be set to a same value. Thus, if no snapshots have been created yet for the LSU, LSU SN=data portion SN, and thus the current write operation is not a first write to the data portion since the last snapshot (i.e., because no snapshot has been created yet, there cannot be any data write since the last snapshot). As further described elsewhere herein, in some embodiments, when a snapshot is created for an LSU, the LSU SN is incremented, but the data portion SNs are not incremented; and the data portion LSU is incremented to a same value as the LSU when a first write to the data portion since a last snapshot is performed. Thus, until such a first write to the data portion after the last snapshot occurs, LSU SN>data portion SN, and thus the step 1212 results in a determination that the current write operation is a first operation to the data portion since a last snapshot of the LSU.

If it is determined in the step 1212 that the write operation is not a first write to the data portion since a last snapshot, then method 1200 may proceed to a step 1214 in which the write operation is processed (e.g., according to known techniques) without any changes being made to snapshot metadata structures. If it is determined in the step 1212 that the write operation is a first write to the data portion since a last snapshot, then method 1200 may proceed to a step 1216.

In the step 1216, physical storage may be allocated (e.g., from the snapshot data pool 115) for the data of data portion corresponding to the last snapshot. In a step 1218, the data from the physical storage location pointed-to by the LSU track table entry for the data portion may be moved to the location of the physical storage allocated in the step 1216. Following the step 1218, the write operation may be processed in the step 1214 concurrently to the performance of the steps 1220-1232. Write processing may include staging the write operation in cache of the storage system, updating the metadata data structures described in relation to FIGS. 3A-3C, exchanging communications with the originating host system, and other known processing.

In a step 1220, a next available entry in a DSPS (e.g., 740) of the storage system may be designated to associate the location of the physical storage allocated in the step 1216 to the data portion. This designated entry may be configured to include a pointer to the physical storage location (e.g., physical storage device and LBA range). In a step 1222, the current DSPS entry for the data portion may be determined, for example, by reference to the CLT entry for the data portion.

In a step 1224, the current ISPS entry for the data portion, as determined from the step 1222, may be updated to point to the DSPS entry designated in the step 1220. In the step 1226, a next available ISPS entry (for the zone of the data portion) may be designated for the data portion, and in a step 1228 the ISPS entry designated in the step 1226 may be updated to point to the LSU table entry for the data portion. In a step 1230, the CLT entry for the data portion may be updated to point to the ISPS entry designated in the step 1226.

In a step 1232, the data portion SN may be set equal to the LSU SN such that, if a next write for the data portion is received before a next snapshot for the LSU is created, the step 1212 may determine that the write operation is not a first write operation to the data portion since a last snapshot, and the method may proceed to the step 1214.

Figure 13A:
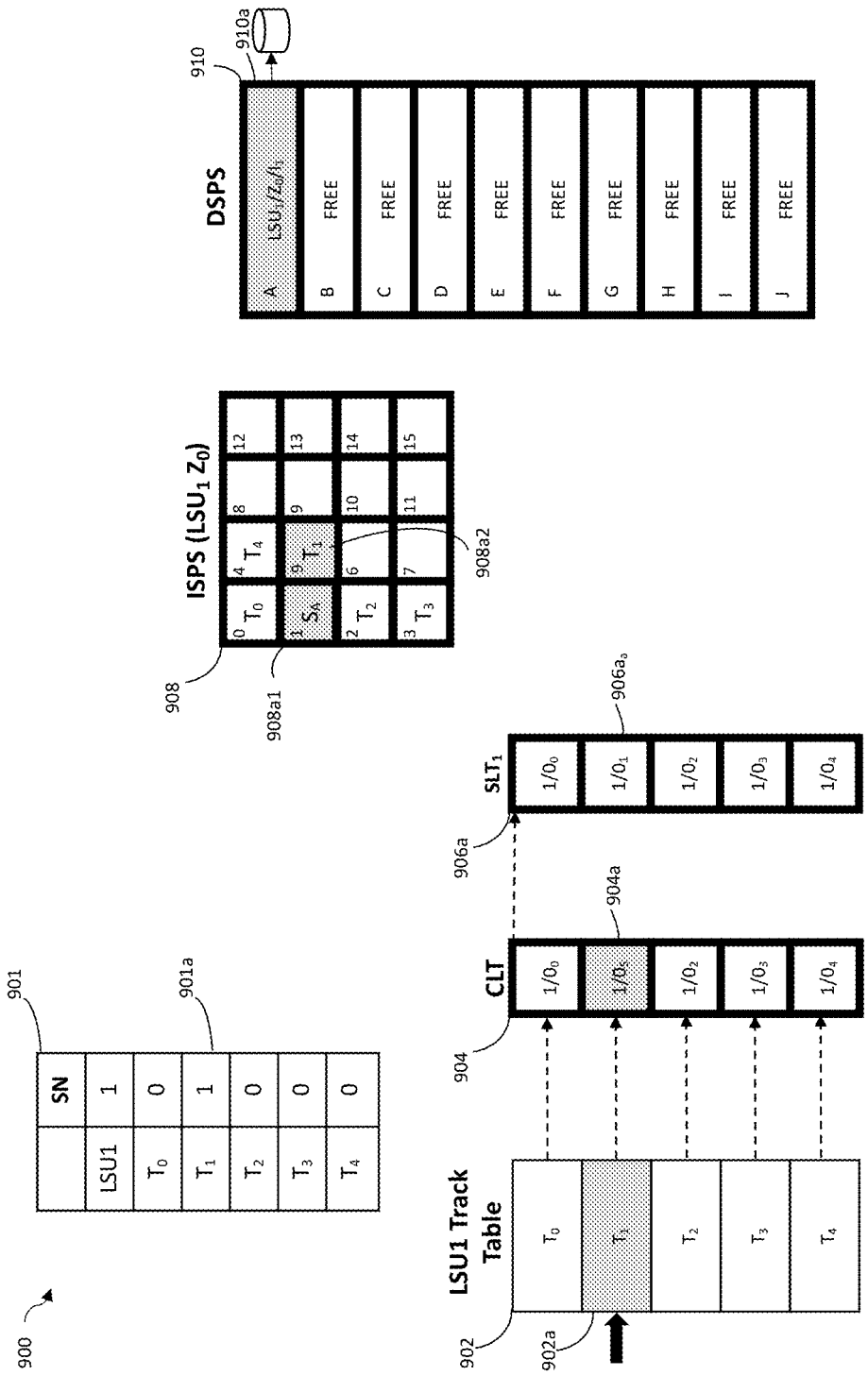
FIGS. 13A-13E illustrate examples of managing snapshot metadata in response to creating snapshots and performing write operations, according to embodiments of the invention.

Performance of the steps 1216-1232 will now be illustrated with respect to FIGS. 13A-13E. FIG. 13A illustrates an example of the management of snapshot metadata structures 900 in response to a first write operation to the LSU1 since the first snapshot represented by SLT1 906a was created; the write operation being a write operation to a data portion represented by entry 902a of LSU track table 902. The values reflected in these data structures represent the values resulting from the management of the data structures in response to the write operation, for example, by performance of the method 1200.

In response to the write operation, physical storage at a physical storage location of a snapshot storage pool may be allocated for the data portion (e.g., the step 1216), and the data from the physical storage location pointed-to by the data portion entry 902a may be moved from such physical storage location to the allocated physical storage location (e.g., the step 1218). An entry 910a of the DSPS 910 may be designated to the data portion and defined to point to the allocated physical storage location (e.g., the step 1220). The current ISPS entry 908a1 for the data portion may be determined (e.g., the step 1222), and the current ISPS entry 908a1 updated to point to the DSPS entry 910a (e.g., the step 1224). A next available ISPS entry 908a2 may be designated for the data portion (e.g., the step 1226), and the designated ISPS entry 908a2 defined to point to the data portion entry 902a in the LSU track table entry 902 (e.g., the step 1228). The CLT entry 904a for the data portion may be updated to point to the designated ISPS entry 908a2 (e.g., the step 1230).

Notably, entry 906aa of SLT1 906a for the data portion is not updated, but continues to point to the previously current ISPS entry for the data portion, entry 908a1, which is no longer the current ISPS entry for the data portion (and thus does not point to the LSU track table entry 902a for the data portion), but rather points to the DSPS entry 910a, which points to the physical storage location of the data overwritten by the write operation. As a result, the overwritten data is maintained and associated with the snapshot represented by SLT1 906a (and any earlier snapshots whose SLTs point to the same entry 908a1), and may be accessed if the LSU is restored to the point in time of the snapshot, or if a target LSU is linked to the snapshot.

The SN of the data portion in entry 901a of the sequence number table 901 may be set equal to the value of the LSU SN (e.g. the step 1232), which indicates that the data portion has been overwritten since the last snapshot; i.e., that the first write to the data portion since the last snapshot has occurred.

Figure 13B:
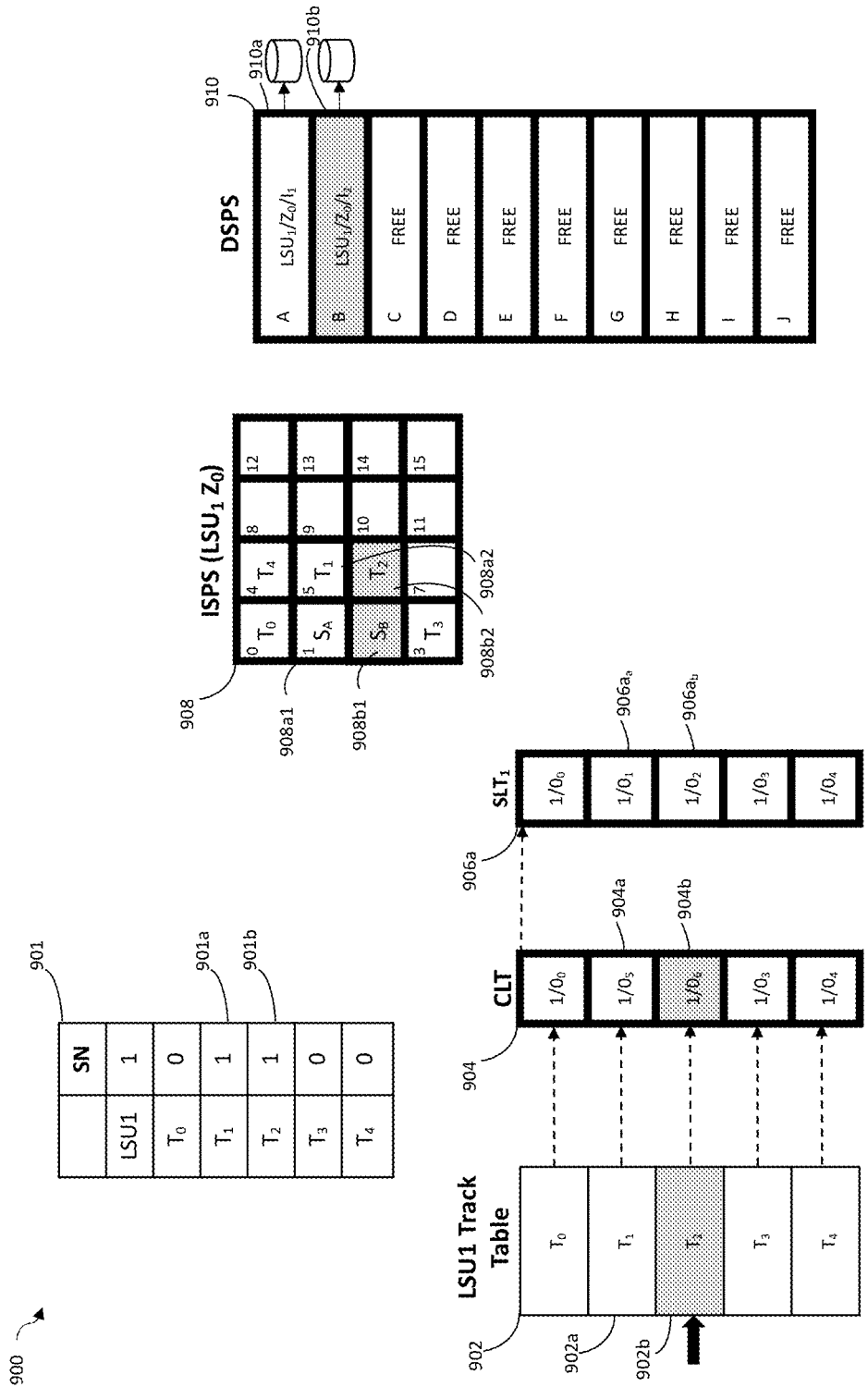

FIG. 13B illustrates an example of the management of snapshot metadata structures 900 in response to a second write operation to the LSU1 since the first snapshot represented by SLT1 906a was created; the write operation being a write operation to a data portion represented by entry 902b of LSU track table 902.

In response to the write operation, physical storage at a physical storage location of a snapshot storage pool may be allocated for the data portion (e.g., the step 1216), and the data from the physical storage location pointed-to by the data portion entry 902b may be moved from such physical storage location to the allocated physical storage location (e.g., the step 1218). A DSPS entry 910b may be designated to the data portion and defined to point to the allocated physical storage location (e.g., the step 1220). The current ISPS entry 908b1 for the data portion may be determined (e.g., the step 1222), and the current ISPS entry 908b1 updated to point to the DSPS entry 910b (e.g., the step 1224). A next available ISPS entry 908b2 may be designated for the data portion (e.g., the step 1226), and the designated ISPS entry 908b2 defined to point to the data portion entry 902b in the LSU track table entry 902 (e.g., the step 1228). The CLT entry 904b for the data portion may be updated to point to the designated ISPS entry 908b2 (e.g., the step 1230).

Entry 906ab of SLT1 906a for the data portion is not updated, but continues to point to the previously current ISPS entry for the data portion, entry 908b1, which is no longer the current ISPS entry for the data portion (and thus does not point to the LSU track table entry 902b for the data portion), but rather points to the DSPS entry 910b, which points to the physical storage location of the data overwritten by the write operation. As a result, the overwritten data is maintained and associated with the snapshot represented by SLT1 906b (and any earlier snapshots whose SLTs point to the same entry 908b1), and may be accessed if the LSU is restored to the point in time of the snapshot, or if a target LSU is linked to the snapshot.

The SN of the data portion in entry 901b of the sequence number table 901 may be set equal to the value of the LSU SN (e.g. the step 1232), which indicates that the data portion has been overwritten since the last snapshot; i.e., that the first write to the data portion since the last snapshot has occurred.

Figure 13C:
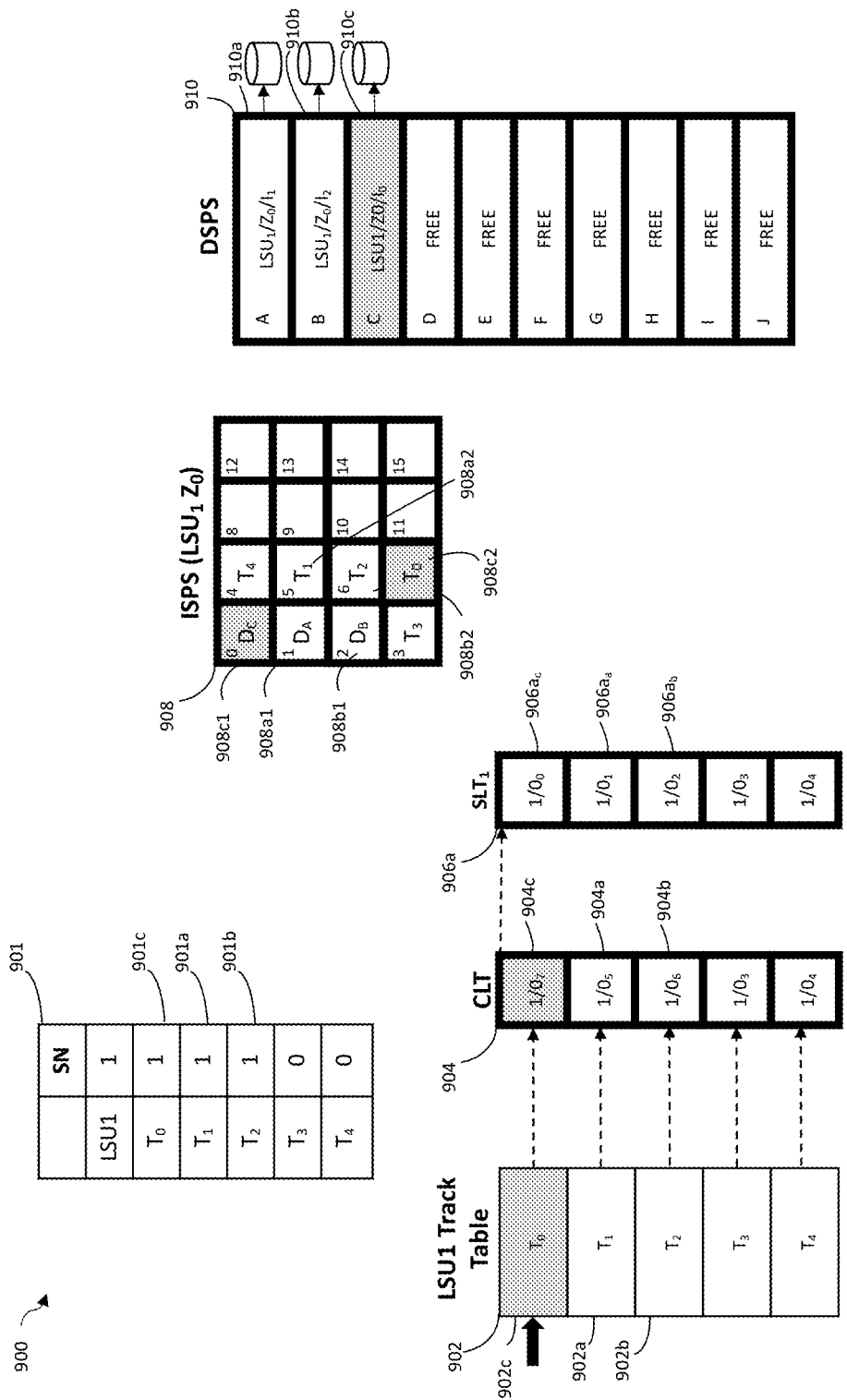

FIG. 13C illustrates an example of the management of snapshot metadata structures 900 in response to a third write operation to the LSU1 since the first snapshot represented by SLT1 906a was created; the write operation being a write operation to a data portion represented by entry 902c of LSU track table 902.

In response to the write operation, physical storage at a physical storage location of a snapshot storage pool may be allocated for the data portion (e.g., the step 1216), and the data from the physical storage location pointed-to by the data portion entry 902c may be moved from such physical storage location to the allocated physical storage location (e.g., the step 1218). A DSPS entry 910c may be designated to the data portion and defined to point to the allocated physical storage location (e.g., the step 1220). The current ISPS entry 908c1 for the data portion may be determined (e.g., the step 1222), and the current ISPS entry 908c1 updated to point to the DSPS entry 910c (e.g., the step 1224). A next available ISPS entry 908c2 may be designated for the data portion (e.g., the step 1226), and the designated ISPS entry 908c2 defined to point to the data portion entry 902c in the LSU track table entry 902 (e.g., the step 1228). The CLT entry 904c for the data portion may be updated to point to the designated ISPS entry 908c2 (e.g., the step 1230).

Entry 906ac of SLT1 906a for the data portion is not updated, but continues to point to the previously current ISPS entry for the data portion, entry 908c1, which is no longer the current ISPS entry for the data portion (and thus does not point to the LSU track table entry 902c for the data portion), but rather points to the DSPS entry 910c, which points to the physical storage location of the data overwritten by the write operation. As a result, the overwritten data is maintained and associated with the snapshot represented by SLT1 906c (and any earlier snapshots whose SLTs point to the same entry 908c1), and may be accessed if the LSU is restored to the point in time of the snapshot, or if a target LSU is linked to the snapshot.

The SN of the data portion in entry 901c of the sequence number table 901 may be set equal to the value of the LSU SN (e.g. the step 1232), which indicates that the data portion has been overwritten since the last snapshot; i.e., that the first write to the data portion since the last snapshot has occurred.

Figure 13D:
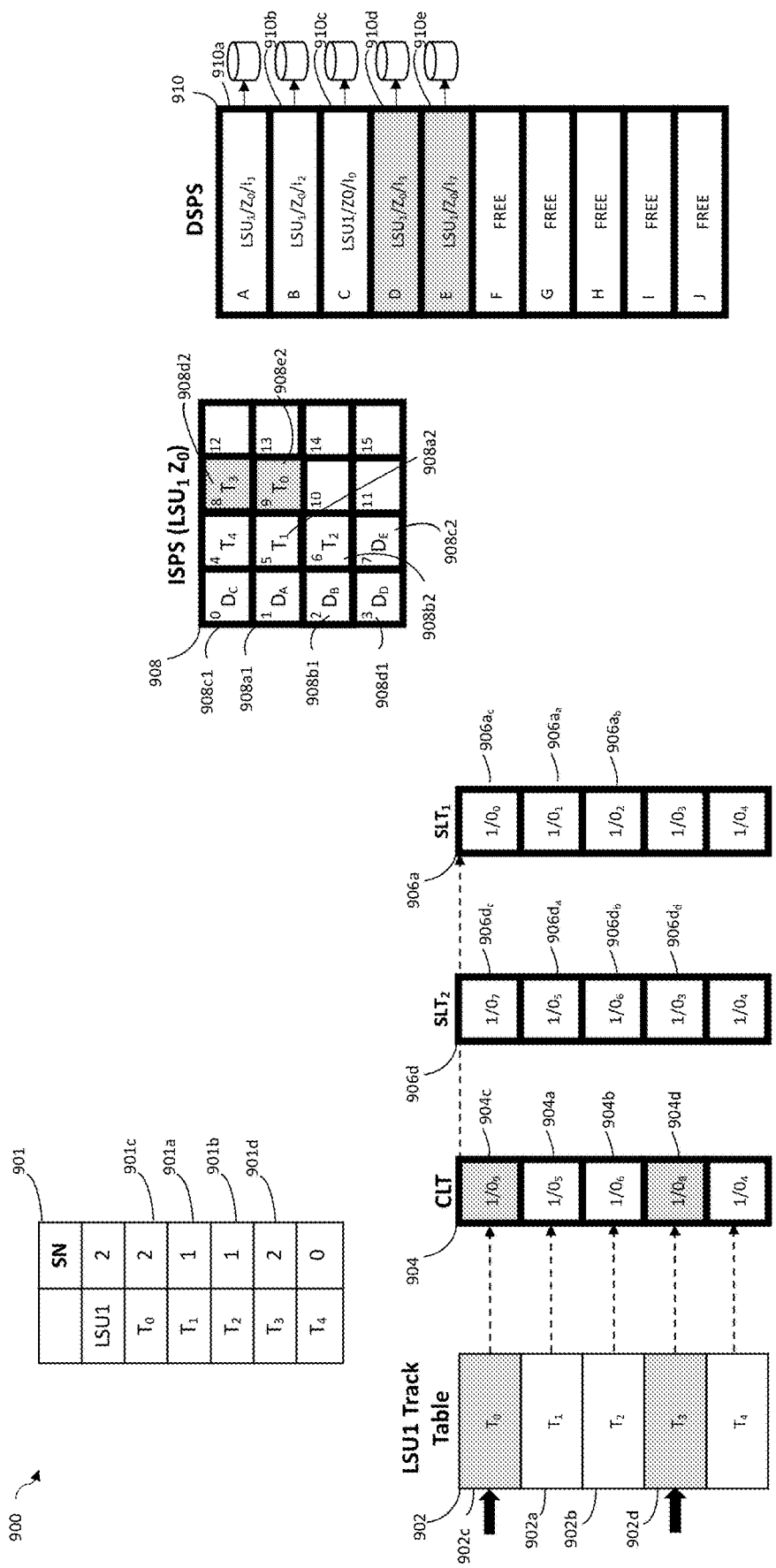

FIG. 13D illustrates an example of the management of snapshot metadata structures 900 in response to first and second write operations to the LSU1 since the second snapshot represented by SLT2 906d was created; the write operations including a first write operation to a data portion represented by entry 902d of LSU track table 902, and a second write operation to the data portion represented by the entry 902c.

In response to the first write operation, physical storage at a physical storage location of a snapshot storage pool may be allocated for the data portion (e.g., the step 1216), and the data from the physical storage location pointed-to by the data portion entry 902d may be moved from such physical storage location to the allocated physical storage location (e.g., the step 1218). A DSPS entry 910d may be designated to the data portion and defined to point to the allocated physical storage location (e.g., the step 1220). The current ISPS entry 908d1 for the data portion may be determined (e.g., the step 1222), and the current ISPS entry 908d1 updated to point to the DSPS entry 910d (e.g., the step 1224). A next available ISPS entry 908d2 may be designated for the data portion (e.g., the step 1226), and the designated ISPS entry 908d2 defined to point to the data portion entry 902d in the LSU track table entry 902 (e.g., the step 1228). The CLT entry 904d for the data portion may be updated to point to the designated ISPS entry 908d2 (e.g., the step 1230).

Entry 906dd of SLT2 906d for the data portion is not updated, but continues to point to the previously current ISPS entry for the data portion, entry 908d1, which is no longer the current ISPS entry for the data portion (and thus does not point to the LSU track table entry 902d for the data portion), but rather points to the DSPS entry 910d, which points to the physical storage location of the data overwritten by the write operation. As a result, the overwritten data is maintained and associated with the snapshot represented by SLT2 906d (and any earlier snapshots whose SLTs point to the same entry 908c1), and may be accessed if the LSU is restored to the point in time of the snapshot, or if a target LSU is linked to the snapshot.

The SN of the data portion in entry 901d of the sequence number table 901 may be set equal to the value of the LSU SN (e.g. the step 1232), which indicates that the data portion has been overwritten since the last snapshot; i.e., that the first write to the data portion since the last snapshot has occurred.

In response to the second write operation, physical storage at a physical storage location of a snapshot storage pool may be allocated for the data portion (e.g., the step 1216), and the data from the physical storage location pointed-to by the data portion entry 902c may be moved from such physical storage location to the allocated physical storage location (e.g., the step 1218). A DSPS entry 910e may be designated to the data portion and defined to point to the allocated physical storage location (e.g., the step 1220). The current ISPS entry 908c2 for the data portion may be determined (e.g., the step 1222), and the current ISPS entry 908c2 updated to point to the DSPS entry 910e (e.g., the step 1224). A next available ISPS entry 908e2 may be designated for the data portion (e.g., the step 1226), and the designated ISPS entry 908e2 defined to point to the data portion entry 902c in the LSU track table entry 902 (e.g., the step 1228). The CLT entry 904c for the data portion may be updated to point to the designated ISPS entry 908e2 (e.g., the step 1230).

Entry 906dc of SLT1 906d for the data portion is not updated, but continues to point to the previously current ISPS entry for the data portion, entry 908c2, which is no longer the current ISPS entry for the data portion (and thus does not point to the LSU track table entry 902c for the data portion), but rather points to the DSPS entry 910e, which points to the physical storage location of the data overwritten by the write operation. As a result, the overwritten data is maintained and associated with the snapshot represented by SLT2 906d (and any earlier snapshots whose SLTs point to the same entry 908c2), and may be accessed if the LSU is restored to the point in time of the snapshot, or if a target LSU is linked to the snapshot.

The SN of the data portion in entry 901c of the sequence number table 901 may be set equal to the value of the LSU SN (e.g. the step 1232), which indicates that the data portion has been overwritten since the last snapshot; i.e., that the first write to the data portion since the last snapshot has occurred.

Figure 13E:
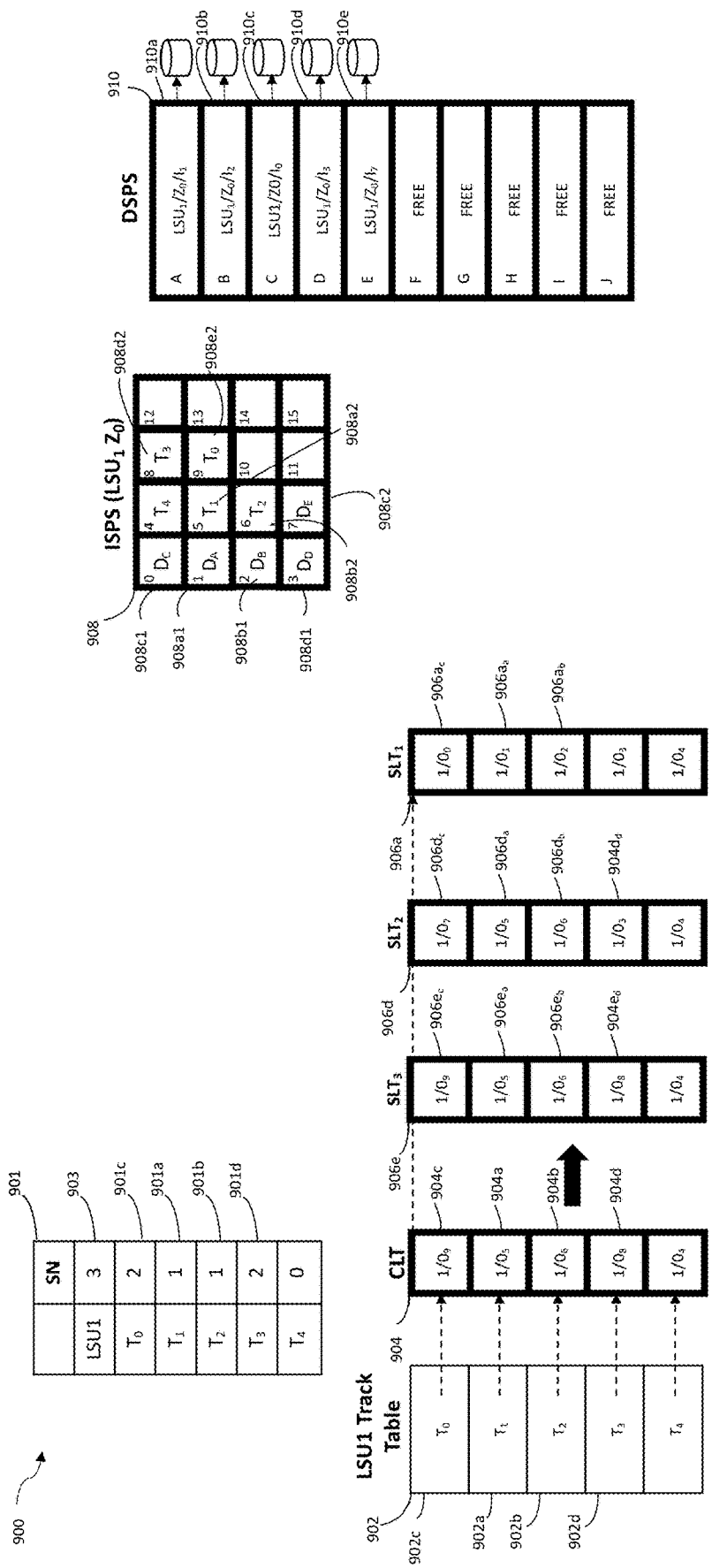

FIG. 13E illustrates the creation of a third snapshot, after performance of the five write operations and creation of two snapshots described in relation to FIGS. 13A-13D, resulting in creation of SLT3 906e and the updating of the value of the SN for the LSU1 entry 903 of the sequence number table 901 (e.g., the step 808). In some embodiments, none of the other data structures 900 are modified.

Returning to FIG. 12, if it is determined in the step 1204 that the LSU is a target LSU, then in a step 1206 it may be determined whether the write operation is a first (i.e., initial) write operation to the target LSU since the target LSU was linked to the source LSU. For example, it may be determined that there is a LSU track table currently defined for target LSU. If an LSU track table is not defined for the target LSU, then it may be concluded that the write operation is a first write operation to the target LSU since the target LSU was linked to the source LSU, and a target LSU track table may be created in a step 1207.

If it is determined in the step 1206 that the write operation is not a first (i.e., initial) write operation to the target LSU since the target LSU was linked to the source LSU, or after the performance of the step 1207, it may be determined whether the write operation is a first write to the zone of the LSU that includes the data portion in a step 1208. For example, it may be determined whether an ISPS already has been allocated to the LSU zone. If an LSU zone has not been allocated, it may be concluded that the write operation is a first write to the zone of the LSU that includes the data portion, and an ISPS may be allocated to the LSU zone in a step 1209.

If it is determined in the step 1208 that the write operation is not a first write to the zone of the LSU that includes the data portion, or after performance of the step 1209, in a step 1210 it may be determined whether the write operation is a first to the data portion since the linking of the target LSU to the source LSU. For example, it may be determined whether the LSU track table entry for the data portion is populated (or alternatively has a null value or the like). If the LSU track table entry is not populated, it may be concluded that the write operation is a first to the data portion since the linking of the target LSU to the source, and the track table entry for the data portion may be populated in a step 1211, and the steps 1226-1232 may be performed as described in more detail elsewhere herein, which may be performed concurrently to processing the write operation itself as described in more detail elsewhere herein.

If it is determined in the step 1210 that the write operation is not a first write to the to the data portion since the linking of the target LSU to the source LSU, then the method 1200 may proceed to the step 1212 described in more detail elsewhere herein.

Figure 14A:
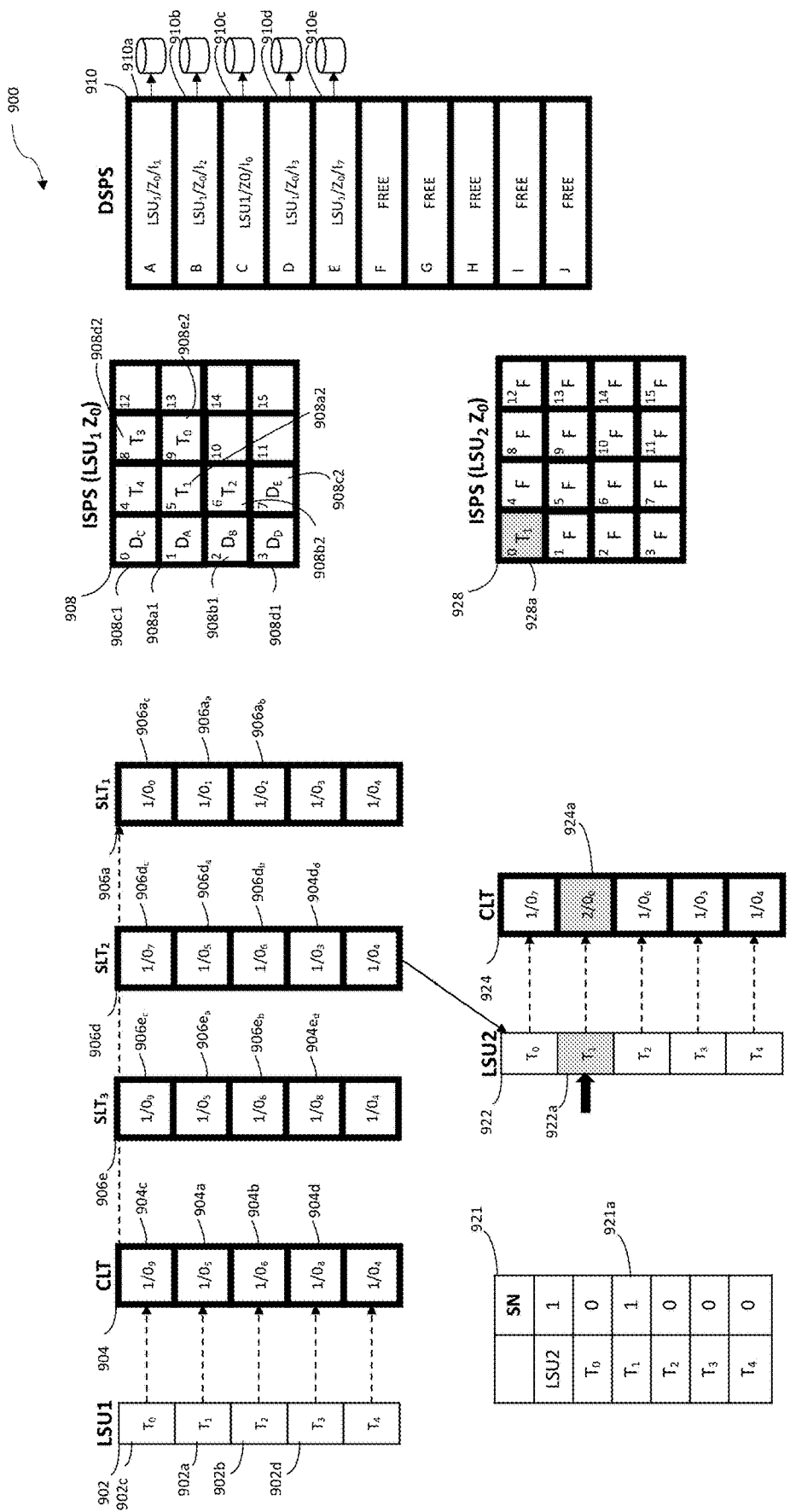
FIGS. 14A and 14B illustrate examples of managing snapshot metadata for a target logical storage unit before creation of a snapshot, according to embodiments of the invention.

FIGS. 14A, 14B, 15A and 15B illustrate examples of the management of snapshot metadata structures 900 in response to write operations to a target LSU. FIG. 14A illustrates an example of the management of snapshot metadata structures 900 in response a first write operation to the target LSU2 following the linking of the target LSU2 to the snapshot of the LSU1 represented by the SLT2 906d, and prior to any snapshots of the LSU2 being created. The write operation is a write operation to a data portion represented by entry 922a of LSU track table 922. The values reflected in the data structures 900 represent the values resulting from the management of the data structures in response to the write operation, for example, by performance of the method 1200.

In response to determining that the write operation is a first write operation to the target LSU2 since linked to the source LSU (e.g., the step 1206), the target LSU tracking table may be created (e.g., the step 1207). In response to determining that the write operation is a first write operation to the zone of the target LSU2 to which the data portion belongs (e.g., the step 1208), an ISPS 928 may be allocated to the target LSU.

In response to determining that the write operation is a first write operation to the data portion since the LSU2 was linked to the second snapshot of the source LSU1 (e.g., the step 1210), the target LSU tracking table entry 922a may be populated (e.g., the step 1211). The next available ISPS entry 928a (i.e., the first entry, as it was the first write to the LSU zone since the linking) is designated to the data portion (e.g., the step 1226), and the ISPS entry 928a is defined to point to the LSU track table entry 922a for the data portion (e.g., the step 1228). The CLT entry 924a for the data portion may be updated to point to the designated ISPS entry 928a (e.g., the step 1230).

The SN of the data portion in entry 902a of the sequence number table 921 for the LSU2 may be set equal to the value of the LSU SN (e.g. the step 1232).

Figure 14B:
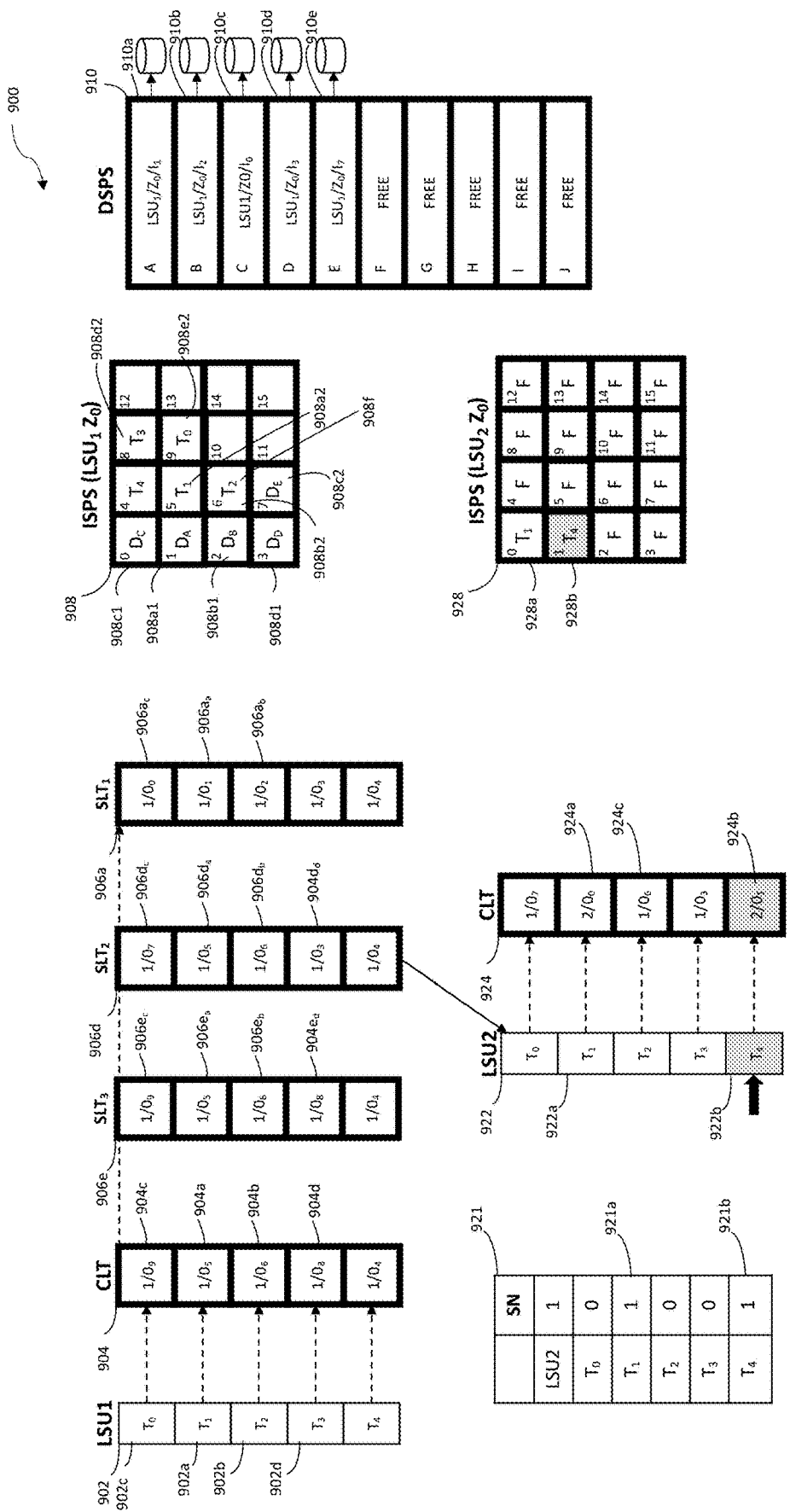

FIG. 14B illustrates an example of the management of snapshot metadata structures 900 in response a second write operation to the target LSU2 following the linking of the target LSU2 to the snapshot of the LSU1 represented by the SLT2 906d, and prior to any snapshots of the LSU2 being created. The write operation is a write operation to a data portion represented by entry 922b of LSU track table 922. The values reflected in the data structures 900 represent the values resulting from the management of the data structures in response to the write operation, for example, by performance of the method 1200.

In response to determining that the write operation is a first write operation to the data portion since the LSU2 was linked to the second snapshot of the source LSU1 (e.g., the step 1210), the target LSU tracking table entry 922b may be populated (e.g., the step 1211). The next available ISPS entry 928b is designated to the data portion (e.g., the step 1226), and the ISPS entry 928b is defined to point to the LSU track table entry 922b for the data portion (e.g., the step 1228). The CLT entry 924b for the data portion may be updated to point to the designated ISPS entry 928b (e.g., the step 1230).

The SN of the data portion in entry 902b of the sequence number table 921 for the LSU2 may be set equal to the value of the LSU SN (e.g., the step 1232).

Figure 15A:
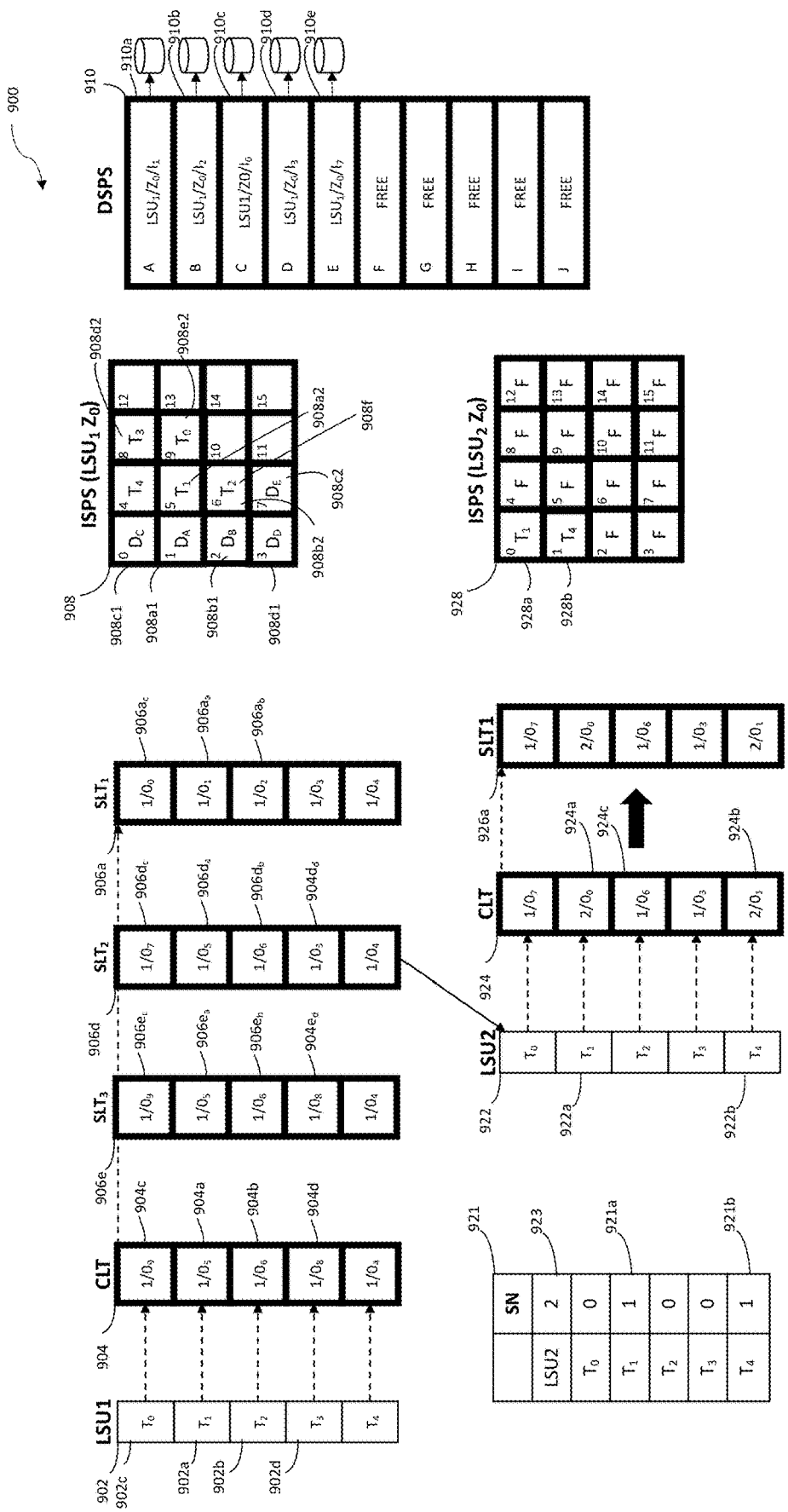
FIGS. 15A and 15B illustrate examples of managing snapshot metadata for a target logical storage unit after creation of a snapshot, according to embodiments of the invention.

FIG. 15A illustrates the creation of a first snapshot of the target LSU2, resulting the create of SLT1 926a, in which the contents of the entries of the CLT 924 are copied into the corresponding entries of the SLT1 926, and the updating of the value of the SN for the LSU2 entry 923 of the sequence number table 921 (e.g., the step 808). In some embodiments, none of the other data structures 900 are modified.

Figure 15B:
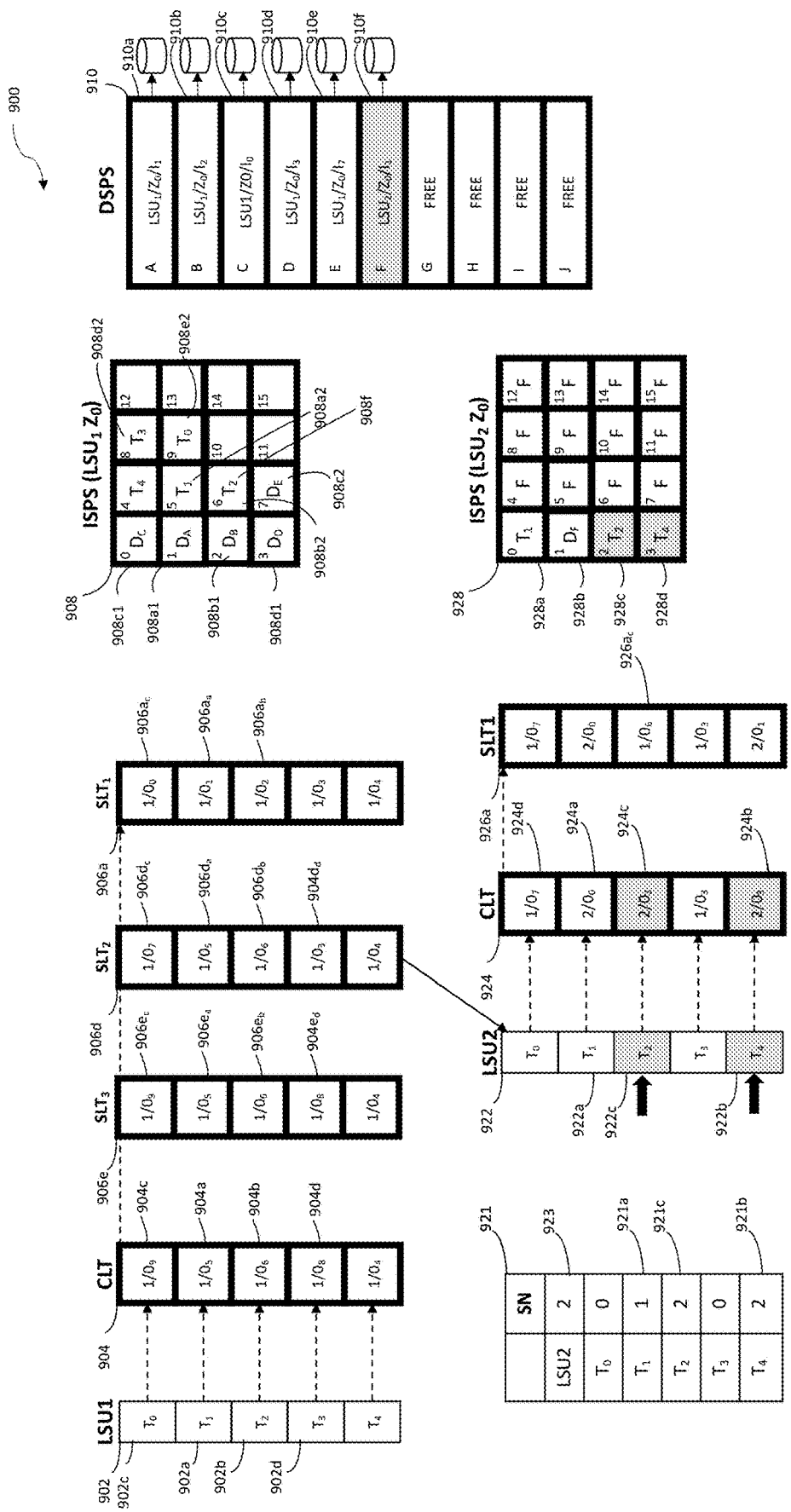

FIG. 15B illustrates an example of the management of snapshot metadata structures 900 in response first and second write operations to the target LSU2 following the creation of the first snapshot of the LSU2. The values reflected in the data structures 900 represent the values resulting from the management of the data structures in response to such write operations, for example, by performance of the method 1200.

The first write operation is a write operation to a data portion represented by entry 922c of LSU track table 922. In response to determining that the write operation is a first write operation to the data portion since the LSU2 was linked to the second snapshot of the source LSU1 (e.g., the step 1210), the target LSU tracking table entry 922c may be populated (e.g., the step 1211). The next available ISPS entry 928c is designated to the data portion (e.g., the step 1226), and the ISPS entry 928c is defined to point to the LSU track table entry 922c for the data portion (e.g., the step 1228). The CLT entry 924c for the data portion may be updated to point to the designated ISPS entry 928c (e.g., the step 1230).

The SN of the data portion in entry 902c of the sequence number table 921 for the LSU2 may be set equal to the value of the LSU SN (e.g., the step 1232).

The second write operation is a write operation to a data portion represented by the entry 922b of LSU track table 922. In response to the second write operation, physical storage at a physical storage location of a snapshot storage pool may be allocated for the data portion (e.g., the step 1216), and the data from the physical storage location pointed-to by the data portion entry 922b may be moved from such physical storage location to the allocated physical storage location (e.g., the step 1218). A DSPS entry 910f may be designated to the data portion and defined to point to the allocated physical storage location (e.g., the step 1220). The current ISPS entry 928b for the data portion may be determined (e.g., the step 1222), and the current ISPS entry 928b updated to point to the DSPS entry 910f (e.g., the step 1224). A next available ISPS entry 928d may be designated for the data portion (e.g., the step 1226), and the designated ISPS entry 928d defined to point to the data portion entry 922b in the LSU track table entry 922 (e.g., the step 1228). The CLT entry 924b for the data portion may be updated to point to the designated ISPS entry 928d (e.g., the step 1230).

The SN of the data portion in entry 921b of the sequence number table 921 for the LSU2 may be set equal to the value of the LSU SN (e.g., the step 1232).

Figure 16:
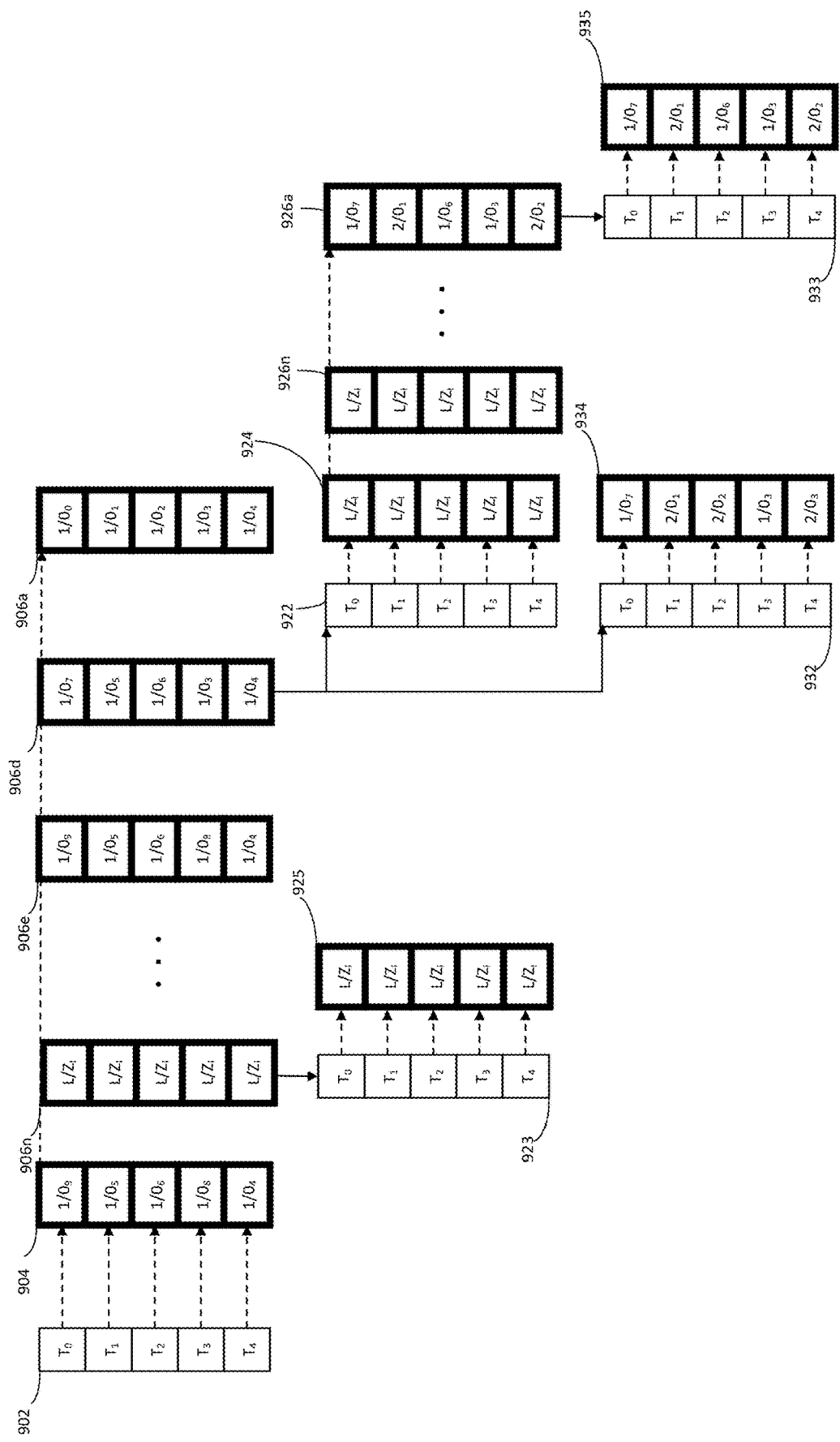
FIG. 16 illustrate examples of snapshot metadata structures for a target logical storage unit, according to embodiments of the invention.

FIG. 16 illustrate examples of snapshot metadata structures for a target LSU for various target LSU scenarios, according to embodiments of the invention. For example, in addition to linking target LSU2 to the second snapshot represented by SLT2 906d, resulting in creation of target CLT 924 for LSU2, another target LSU may be linked to the same snapshot, resulting in creation of target CLT 934 for the other target LSU, corresponding to LSU track table 932 of the target LSU (which may be created in response to a first write to the other target LSU after the linking).

Further, a target LSU may be linked to a snapshot of another target LSU, as illustrated by the creation of LSU track table 933 and target CLT 935 from SLT2 926a for a target LSU in response to being linked to a first snapshot of target LSU2. In addition, multiple target LSUs may be linked to snapshots from a same familial lineage. For example, a target LSU may be linked to a later snapshot of LSU1 (relative the first snapshot represented by SLT 906a), resulting in creation of target CLT 925 derived from source SLT 906n, representing the later snapshot, and a LSU track table 925 for the target LSU, corresponding to LSU track table 923.

Figure 17:
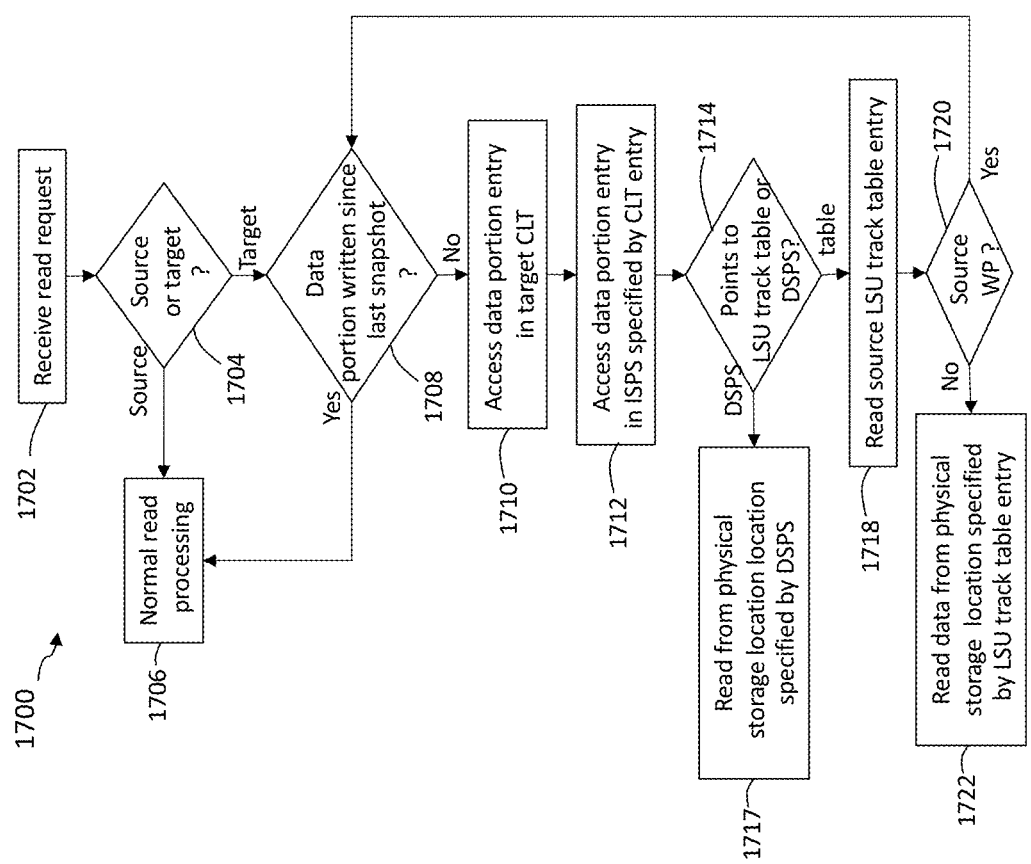
FIG. 17 is a flowchart illustrating a method of accessing data in response to a read operation, according to embodiments of the invention.

FIG. 17 is a flowchart illustrating a method 1600 of accessing data in response to a read operation, according to embodiments of the invention. Other embodiments of a method of accessing data in response to a read operation, for example, variations of the method 1600, are possible and are intended to fall within the scope of the invention.

In a step 1702, a response is received, for example, from a host system that specifies a read operation for a data portion of an LSU of a data storage system. In a step 1704, it is determined whether the read request was received from a target LSU or an LSU that is not a target (e.g., a source LSU). If the read operation was received from a non-target LSU, the read operation may be performed in accordance with normal read operation procedure without access any snapshot metadata data structures, for example, on a system in which accessing (e.g., reading and writing) snapshot data (aside from a restore of a snapshot) is only allowed using target LSUs.

If it is determined in the step 1704 that the read request was received from a target LSU, then it may be determined in a step 1708 whether the data portion has been written since a last snapshot was created for the LSU. For example, the step 1708 may include comparing the SN of the target LSU to the SN of the data portion. If the LSU SN=the data portion SN, it may be concluded that the data portion has been written since the last snapshot was created for the LSU, in which case the method 1700 may proceed to step 1706. For example, referring to FIG. 15B, if the data portion is the data portion represented by LSU2 track entry 922b or 922c, then it may be determined from entries 923 and 921b or 921c, respectively, of the sequence number table 921 that the LSU SN ("2")=the data portion SN ("2"), and normal read processing may be performed, including accessing the entries 922b or 922c.

If the LSU SN is not equal to (e.g., is greater than) the data portion SN, it may be concluded that the data portion has not been written since the last snapshot was created for the LSU. For example, referring to FIG. 15B, if the data portion is the data portion represented by LSU2 track entry 922a, then it may be determined from entries 923 and 921a of the sequence number table 921 that the LSU SN ("2") does not equal the data portion SN ("1"). If no snapshot has been created yet for the target LSU since being linked to a source LSU (e.g., as illustrated in FIG. 14B), then, since no snapshot exists, there has been no data written to the data portion since the last snapshot, and thus the test of the step 1708 returns a negative result.

If it is determined in the step 1708 that no data has been written to the data portion since a last snapshot was created for the target LSU, a target LSU CLT entry for the data portion may be accessed in a step 1710, which may specify an ISPS entry for the data portion. For example, referring to FIG. 15B, if the read operation is for the data portion represented by CLT entry 924d, the ISPS entry is 908c2. As another example, referring to FIG. 14B, if the read operation is for the data portion represented by CLT entry 924c, the ISPS entry is 908f.

In a step 1712, the ISPS entry specified by the CLT entry may be accessed, which may specify an LSU track table entry or a DSPS entry for the data portion. In a step 1714, it may be determined whether the ISPS entry points to an LSU track table entry or a DSPS entry. If the ISPS entry specifies a DSPS entry, the DSPS entry may be accessed, which may specify a physical storage location, for example, a physical storage device and LBA address range thereof; and in a step 1717 the contents of the physical storage location may be read. For example, referring to FIG. 15B, if the read operation is for the data portion represented by CLT entry 924d, the ISPS entry is 908c2, which specifies DSPS entry 910e, and the contents of the storage location pointed-to by the DSPS entry 910e may be read.

If it is determined in the step 1714 that the ISPS entry specifies an LSU track table entry, it should be appreciated that the LSU track entry would be an LSU track entry of a source LSU. The LSU track entry would be an LSU track entry of a source LSU because: if the data portion had been overwritten since a last snapshot such that the ISPS entry would point to an entry of the target LSU table for the data portion, steps 1710 and 1712 would not have been performed as a result of the performance of the step 1708; and 2) if the step 1714 is reached (meaning the result of the test of the step 1708 is negative) and the data portion has been overwritten at any point since the target LSU prior to the last snapshot, the ISPS entry would point to a DSPS entry. The only scenario in which the step 714 is reached and it is determined that the ISPS entry points to an LSU track table entry is if the data portion has not been overwritten since the target LSU was linked to a snapshot of the source LSU, in which case the target LSU CLU entry for the data portion would still include a pointer copied from the source SLT representing the snapshot (per the step 1006 of the method 1000), which points to an ISPS entry of the source LSU. If this ISPS entry points to an LSU track table, it is the LSU track table of the source LSU. For example, referring to FIG. 14B, if the read operation is for the data portion represented by CLT entry 924c, the ISPS entry is 908f, which specifies source LSU1 track table entry 902b.

If it is determined in the step 1714 that the ISPS entry specifies an LSU track entry, which as described above would necessarily be a source LSU track table entry, then the source LSU track entry may be read (and locked) in a step 1718.

In a step 1720, it may be determined whether there is any write pending (WP) for the data portion on the soured LSU, meaning that there is a write operation for the data portion staged in cache that has not yet been stored (i.e., de-staged) to a physical storage device on the storage system. If there is no such write pending for the data portion for the source LSU, then in a step 1722 the data may be read from the physical storage location (e.g., LBA range of a physical storage device) specified by the LSU track table entry (and the source LSU track entry unlocked).

If there is a write pending for the data portion for the source LSU, then the method 1700 may wait for the data to be de-staged to disk (not shown) or, as illustrated in FIG. 17, return to the step 1708 (and unlock the source LSU track entry) in case a write operation for the data portion is received on the target LSU while the write on the source LSU remains pending.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 800, 1000, 1200 and 1700, or parts thereof, may be implemented using one or more of the systems and/or data structures described in relation to FIGS. 1-7 and 9A-9D, 11 and 13A-16, or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, any suitable combination thereof.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of managing snapshots on a data storage system including one or more physical storage devices on which data for a plurality of logical storage units is stored, each logical storage unit including a plurality of data portions, the method comprising:

for a first of the plurality of logical storage units, providing a first snapshot pointer structure including a plurality of entries, each entry of the first snapshot pointer structure corresponding to a physical storage location at which data is stored for a data portion of the first logical storage unit at a particular point in time;

providing a current lookup table for the first logical storage unit, the current lookup table corresponding to a current time and including a plurality of entries, each entry of the current lookup table corresponding to a respective one of the plurality of data portions of the first logical storage unit and including a reference to a respective entry of the first snapshot pointer structure; and creating a first snapshot lookup table for the first logical storage unit responsive to receiving a request to create a snapshot of the first logical storage unit, the first snapshot lookup table corresponding to a first point in time and including a plurality of entries, each entry of the first snapshot lookup table corresponding to a respective one of the plurality of data portions of the first logical storage unit and including a reference to a respective entry of the first snapshot pointer structure, wherein said creating the first snapshot lookup table includes copying contents of the current lookup table into the first snapshot lookup table.

2. The method of claim 1, wherein a first entry of the first snapshot pointer structure corresponds to a first data portion of the first logical storage unit at the first point in time, and the first entry of the first snapshot pointer structure is referenced by a first entry of the first snapshot lookup table corresponding to the first data portion and a first entry of the current lookup table corresponding to the first data portion, and wherein the method further comprises:
  receiving a write request for the first data portion; and
  in response to receiving the write request:
    determining if the write request is a first write request to the first data portion since the first snapshot lookup table was created; and
    if the write request is the first write request for the data portion since the first snapshot lookup table was created:
      designating a second entry of the first snapshot pointer structure to the first data portion; and
      updating the first entry of the current lookup table to reference the second entry of the first snapshot pointer structure, wherein the first entry of the first snapshot lookup table is not updated.

3. The method of claim 1, wherein, in response to a request to create another snapshot of the first logical storage unit, creating a second snapshot lookup table for the first logical storage unit by copying contents of the current lookup table.

4. The method of claim 1, further comprising:
  in response to a request to link a target logical storage unit to the first logical storage unit for the first point in time, creating a target current lookup table, including copying contents of the first snapshot lookup table into the target current lookup table.

5. The method of claim 4, wherein a logical storage unit comprises a plurality of zones, each zone representing a subset of the logical storage unit, the method further comprising:
  in response to a first write request to a first zone of the target logical storage unit, creating a target snapshot pointer structure for the first zone of the target logical storage unit.

6. The method of claim 4, further comprising:
  receiving a read request for a first data portion of the target logical storage unit; and
  in response to the read request, determining a physical storage location of the first data portion of the target logical storage unit by accessing a first entry of the target current lookup table corresponding to the first data portion.

7. A system for managing snapshots on the data storage system including one or more physical storage devices on which data for a plurality of logical storage units is stored, each logical storage unit including a plurality of data portions, the system comprising:
  a first snapshot pointer structure for a first of the plurality of logical storage units, wherein the first snapshot pointer structure is stored in a memory of the system and includes a plurality of entries, each entry of the first snapshot pointer structure corresponding to a physical storage location at which data is stored for a data portion of the first logical storage unit at a particular point in time;
  a current lookup table for the first logical storage unit, wherein the current lookup table is stored in a memory of the system, the current lookup table corresponding to a current time and including a plurality of entries, each entry of the current lookup table corresponding to a respective one of the plurality of data portions of the first logical storage unit and including a reference to a respective entry of the first snapshot pointer structure;
  a first snapshot lookup table for the first logical storage unit, wherein the first snapshot lookup table is stored in a memory of the system, the first snapshot lookup table corresponding to a first point in time and including a plurality of entries, each entry of the first snapshot lookup table corresponding to a respective one of the plurality of data portions of the first logical storage unit and including a reference to a respective entry of the first snapshot pointer structure; and
  wherein a memory of the system further comprises code stored thereon that, when executed, performs a method including:
    creating the first snapshot lookup table for the first logical storage unit responsive to receiving a request to create a snapshot of the first logical storage unit, wherein said creating the first snapshot lookup table includes copying contents of the current lookup table into the first snapshot lookup table.

8. The system of claim 7, wherein a first entry of the first snapshot pointer structure corresponds to a first data portion of the first logical storage unit at the first point in time, and the first entry of the first snapshot pointer structure is referenced by a first entry of the first snapshot lookup table corresponding to the first data portion and a first entry of the current lookup table corresponding to the first data portion, and wherein the method further includes:
  receiving a write request for the first data portion; and
  in response to receiving the write request:
    determining if the write request is a first write request to the first data portion since the first snapshot lookup table was created; and
    if the write request is the first write request for the data portion since the first snapshot lookup table was created:
      designating a second entry of the first snapshot pointer structure to the first data portion; and
      updating the first entry of the current lookup table to reference the second entry of the first snapshot pointer structure, wherein the first entry of the first snapshot lookup table is not updated.

9. The system of claim 7, and wherein the method further includes:
  in response to a request to create another snapshot of the first logical storage unit, creating a second snapshot lookup table for the first logical storage unit by copying contents of the current lookup table.

10. The system of claim 7, wherein the method further includes:
  in response to a request to link a target logical storage unit to the first logical storage unit for the first point in time, creating a target current lookup table, including copying contents of the first snapshot lookup table into the target current lookup table.

11. The system of claim 10, wherein a logical storage unit comprises a plurality of zones, each zone representing a subset of the logical storage unit, and
  wherein the method further includes, in response to a first write request to a first zone of the target logical storage unit, creating a target snapshot pointer structure for the first zone of the target logical storage unit.

12. The system of claim 10, wherein a logical storage unit comprises a plurality of zones, each zone representing a subset of the logical storage unit, and wherein the method further includes:
   receiving a read request for a first data portion of the target logical storage unit; and
   in response to the read request, determining a physical storage location of the first data portion of the target logical storage unit by accessing a first entry of the target current lookup table corresponding to the first data portion.

13. For a data storage system including one or more physical storage devices on which data fora plurality of logical storage units is stored, wherein each logical storage unit includes a plurality of data portions, computer-readable media having software stored thereon for managing snapshots on the data storage system, the software comprising:
   executable code that provides a first snapshot pointer structure for a first of the plurality of logical storage units, the first snapshot pointer structure including a plurality of entries, each entry of the first snapshot pointer structure corresponding to a physical storage location at which data is stored for a data portion of the first logical storage unit at a particular point in time;
   executable code that provides a current lookup table for the first logical storage unit, the current lookup table corresponding to a current time and including a plurality of entries, each entry of the current lookup table corresponding to a respective one of the plurality of data portions of the first logical storage unit and including a reference to a respective entry of the first snapshot pointer structure; and
   executable code that creates a first snapshot lookup table for the first logical storage unit responsive to receiving a request to create a snapshot of the first logical storage unit, the first snapshot lookup table corresponding to a first point in time and including a plurality of entries, each entry of the first snapshot lookup table corresponding to a respective one of the plurality of data portions of the first logical storage unit and including a reference to a respective entry of the first snapshot pointer structure, wherein said creating the first snapshot lookup table includes copying contents of the current lookup table into the first snapshot lookup table.

14. The computer-readable media of claim 13, wherein a first entry of the first snapshot pointer structure corresponds to a first data portion of the first logical storage unit at the first point in time, and the first entry of the first snapshot pointer structure is referenced by a first entry of the first snapshot lookup table corresponding to the first data portion and a first entry of the current lookup table corresponding to the first data portion, and wherein the software further comprises:
   executable code that receives a write request for the first data portion; and
   executable code that, in response to receiving the write request:
   determines if the write request is a first write request to the first data portion since the first snapshot lookup table was created; and
   if the write request is the first write request for the data portion since the first snapshot lookup table was created:
      designates a second entry of the first snapshot pointer structure to the first data portion; and
      updates the first entry of the current lookup table to reference the second entry of the first snapshot pointer structure, wherein the first entry of the first snapshot lookup table is not updated.

15. The computer-readable media of claim 13, the software further comprising executable code that, in response to a request to create another snapshot of the first logical storage unit, creates a second snapshot lookup table for the first logical storage unit by copying contents of the current lookup table.

16. The computer-readable media of claim 13, the software further comprising:
   executable code that, in response to a request to link a target logical storage unit to the first logical storage unit for the first point in time, creates a target current lookup table, including copying contents of the first snapshot lookup table into the target current lookup table.

17. The computer-readable media of claim 16, the software further comprising:
   executable code that receives a read request for a first data portion of the target logical storage unit; and
   executable code that, in response to the read request, determines a physical storage location of the first data portion of the target logical storage unit by accessing a first entry of the target current lookup table corresponding to the first data portion.

\* \* \* \* \*